(12) United States Patent
O'Halloran

(10) Patent No.: US 11,497,307 B2
(45) Date of Patent: Nov. 15, 2022

(54) METHOD AND APPARATUS FOR STORING CLAMPS

(71) Applicant: Woodpeckers, LLC, Strongsville, OH (US)

(72) Inventor: Edward A. O'Halloran, Elyria, OH (US)

(73) Assignee: Woodpeckers, LLC, Strongsville, OH (US)

( * ) Notice: Subject to any disclaimer, the term of this patent is extended or adjusted under 35 U.S.C. 154(b) by 0 days.

(21) Appl. No.: 17/483,158

(22) Filed: Sep. 23, 2021

(65) Prior Publication Data
US 2022/0053931 A1 Feb. 24, 2022

Related U.S. Application Data

(62) Division of application No. 16/409,978, filed on May 13, 2019, now Pat. No. 11,154,133.

(51) Int. Cl.
| | |
|---|---|
| *A47B 81/00* | (2006.01) |
| *A47B 47/02* | (2006.01) |
| *A47B 57/58* | (2006.01) |
| *A47B 96/06* | (2006.01) |
| *A47B 47/00* | (2006.01) |
| *B23K 37/04* | (2006.01) |

(52) U.S. Cl.
CPC .......... *A47B 81/00* (2013.01); *A47B 47/0058* (2013.01); *A47B 47/027* (2013.01); *A47B 57/58* (2013.01); *A47B 96/067* (2013.01); *B23K 37/0435* (2013.01)

(58) Field of Classification Search
CPC ... A47B 81/00; A47B 47/0058; A47B 47/027; A47B 57/58; A47B 96/067; B23K 37/0435
See application file for complete search history.

(56) References Cited

U.S. PATENT DOCUMENTS

| | | | |
|---|---|---|---|
| D107,328 S | 12/1937 | Ullrich | |
| 2,805,777 A | 9/1957 | Larson | |
| 2,815,863 A * | 12/1957 | Larson | A47B 81/007 248/300 |
| 3,285,426 A * | 11/1966 | Wilcke | B25H 3/04 248/242 |
| 4,345,688 A | 8/1982 | De Boer | |
| D269,396 S | 6/1983 | Bricker | |
| 4,632,256 A * | 12/1986 | Gambello | A47F 5/0823 211/175 |
| 4,747,590 A | 5/1988 | Yang | |

(Continued)

*Primary Examiner* — Patrick D Hawn
(74) *Attorney, Agent, or Firm* — Sand, Sebolt & Wernow Co., LPA

(57) ABSTRACT

A tool storage system has a universal mounting bracket coupled to a support surface formed with a plurality of apertures that align with differently sized support arms that support a tool therefrom. The apertures are aligned along a common horizontal plane and the support arms have different heights that allow tools to be hung therefrom in a nesting relationship so that more tools can occupy less space or area relative to the support surface. The nesting relationship of the tools provides for a first tool supported by the first arm to fit within a space defined by the second tool supported by the second arm. In some instance, the first and second arms may be part of a pair of support arms, respectively.

19 Claims, 13 Drawing Sheets

(56) References Cited

U.S. PATENT DOCUMENTS

| | | |
|---|---|---|
| D297,111 S | 8/1988 | Thompson et al. |
| 4,768,660 A * | 9/1988 | Handler .................. B25H 3/04 |
| | | 248/222.12 |
| 4,817,900 A * | 4/1989 | Whittington ............ A47F 5/005 |
| | | 248/225.11 |
| D302,234 S | 7/1989 | McNamee et al. |
| 4,844,266 A * | 7/1989 | Small .................... A47F 5/005 |
| | | 211/88.01 |
| 4,898,354 A * | 2/1990 | Whittington ......... A47B 57/585 |
| | | 211/175 |
| D337,042 S | 7/1993 | Lin et al. |
| 5,224,609 A * | 7/1993 | Bauer .................. A47F 7/0021 |
| | | 211/70.6 |
| D339,971 S | 10/1993 | Hatcher |
| 5,379,976 A * | 1/1995 | DeGirolamo ........... B25H 3/04 |
| | | 248/222.51 |
| D367,001 S | 2/1996 | Bright |
| D370,002 S | 5/1996 | Miller |
| 5,515,969 A | 5/1996 | Schonenbach |
| D376,751 S | 12/1996 | Hanson et al. |
| D378,748 S | 4/1997 | Miller |
| D378,749 S | 4/1997 | Miller |
| 5,687,856 A * | 11/1997 | Kendrena ............. A47L 13/512 |
| | | 211/94.01 |
| 5,740,927 A * | 4/1998 | Yemini ................. A47F 5/0853 |
| | | 211/94.01 |
| D394,632 S | 5/1998 | Miller |
| 5,836,131 A * | 11/1998 | Viola .................... E04B 1/2612 |
| | | 52/715 |
| D422,483 S | 4/2000 | Shea |
| D439,558 S | 3/2001 | Potter |
| 6,481,583 B1 * | 11/2002 | Black ...................... B25H 3/04 |
| | | 211/89.01 |
| 6,491,172 B2 | 12/2002 | Chance et al. |
| 6,499,608 B1 | 12/2002 | Sterling et al. |
| 6,591,995 B1 * | 7/2003 | Grove .................. A47F 5/0815 |
| | | 211/87.01 |
| D478,804 S | 8/2003 | Titus |
| D483,656 S | 12/2003 | Shea |
| 6,702,128 B2 | 3/2004 | Winig et al. |
| 6,719,153 B2 * | 4/2004 | Heneveld ................ B25H 3/04 |
| | | 211/70.1 |
| 6,729,485 B2 * | 5/2004 | Ehrgott ................ A47F 5/0823 |
| | | 248/221.11 |
| 6,749,161 B1 * | 6/2004 | Will ......................... B25H 3/04 |
| | | 248/222.51 |
| D500,666 S | 1/2005 | Murphy et al. |
| D502,387 S | 3/2005 | Hyakkoku |
| 7,051,884 B2 * | 5/2006 | Dick ..................... A47F 5/0815 |
| | | 81/DIG. 5 |
| D523,802 S | 6/2006 | Reimitz |
| D538,734 S | 3/2007 | Reimitz |
| D539,208 S | 3/2007 | Reimitz |
| 7,219,808 B2 * | 5/2007 | Wright ................. A47F 5/0815 |
| | | 211/DIG. 1 |
| 7,228,977 B2 | 6/2007 | Perkins et al. |
| 7,353,957 B2 * | 4/2008 | Winig ................... A47F 5/0815 |
| | | 211/59.1 |
| 7,484,310 B2 | 2/2009 | Jaffers et al. |
| D594,313 S | 6/2009 | Clarke |
| D595,122 S | 6/2009 | Clarke |
| 7,677,400 B2 * | 3/2010 | Bayazit ................ G02B 6/4452 |
| | | 211/26 |
| 7,850,154 B2 | 12/2010 | Feuge |
| 7,882,965 B1 | 2/2011 | Kao |
| D638,282 S | 5/2011 | Robinson |
| D646,955 S | 10/2011 | Sanders et al. |
| D647,386 S | 10/2011 | Pelini |
| D649,026 S | 11/2011 | Kong et al. |
| D654,063 S | 2/2012 | Sergi |
| D658,043 S | 4/2012 | Burr |
| D665,656 S | 8/2012 | Anzelmo |
| D679,174 S | 4/2013 | Nowak |
| D682,069 S | 5/2013 | Lehane et al. |
| 9,044,090 B2 | 6/2015 | Drake |
| D734,653 S | 7/2015 | Martin et al. |
| D735,170 S | 7/2015 | Colvin |
| 9,144,306 B2 | 9/2015 | Kao |
| 9,173,507 B2 * | 11/2015 | Thrush .................. A47F 5/0846 |
| D760,578 S | 7/2016 | Sigona |
| D853,377 S | 7/2016 | Crandon et al. |
| D768,470 S | 10/2016 | Noturno |
| D770,962 S | 11/2016 | Badillo |
| 9,597,792 B1 | 3/2017 | Kao |
| D789,179 S | 6/2017 | Minkovich |
| 9,808,128 B2 * | 11/2017 | Minkovich ............... A47K 3/30 |
| D834,463 S | 11/2018 | Brunkhurst |
| D843,823 S | 3/2019 | Bouchard |
| D852,024 S | 6/2019 | LaPorta |
| D854,399 S | 7/2019 | Winter |
| D860,769 S | 9/2019 | Wokutch et al. |
| 10,405,676 B1 * | 9/2019 | Underwood ............ F16B 1/00 |
| D879,167 S | 3/2020 | Winans |
| 10,729,244 B2 * | 8/2020 | Hansen, II ............ A47F 5/0807 |
| D899,911 S | 10/2020 | O'Halloran |
| D899,912 S | 10/2020 | O'Halloran |
| D902,693 S | 11/2020 | Freeman |
| D902,786 S | 11/2020 | Johnson |
| 11,089,885 B2 * | 8/2021 | Keller ................... A47F 5/0846 |
| 2003/0102614 A1 * | 6/2003 | Foshag .................. B25B 5/102 |
| | | 269/171 |
| 2005/0082730 A1 | 4/2005 | Murray et al. |
| 2006/0102569 A1 * | 5/2006 | Laga ..................... A47F 5/0807 |
| | | 211/70.6 |
| 2007/0216078 A1 | 9/2007 | Jaffers et al. |
| 2008/0054142 A1 * | 3/2008 | Deland ................. A47F 5/0815 |
| | | 248/223.31 |
| 2008/0251476 A1 * | 10/2008 | Shiao ....................... B25H 3/04 |
| | | 211/70.6 |
| 2010/0219144 A1 * | 9/2010 | Salmon ................. A47F 5/0846 |
| | | 211/94.01 |
| 2010/0289203 A1 * | 11/2010 | Janson ................... B25B 5/006 |
| | | 269/208 |
| 2011/0266283 A1 * | 11/2011 | Ernst .................... A47B 96/067 |
| | | 220/476 |
| 2018/0116427 A1 * | 5/2018 | Gupta .................. F16M 13/022 |
| 2019/0331288 A1 * | 10/2019 | Gupta .................. A47B 96/027 |
| 2020/0359789 A1 | 11/2020 | O'Halloran |
| 2021/0112998 A1 * | 4/2021 | Gargano ............... A47F 5/0823 |
| 2021/0401175 A1 * | 12/2021 | LeBlanc ............... A47B 96/067 |

* cited by examiner

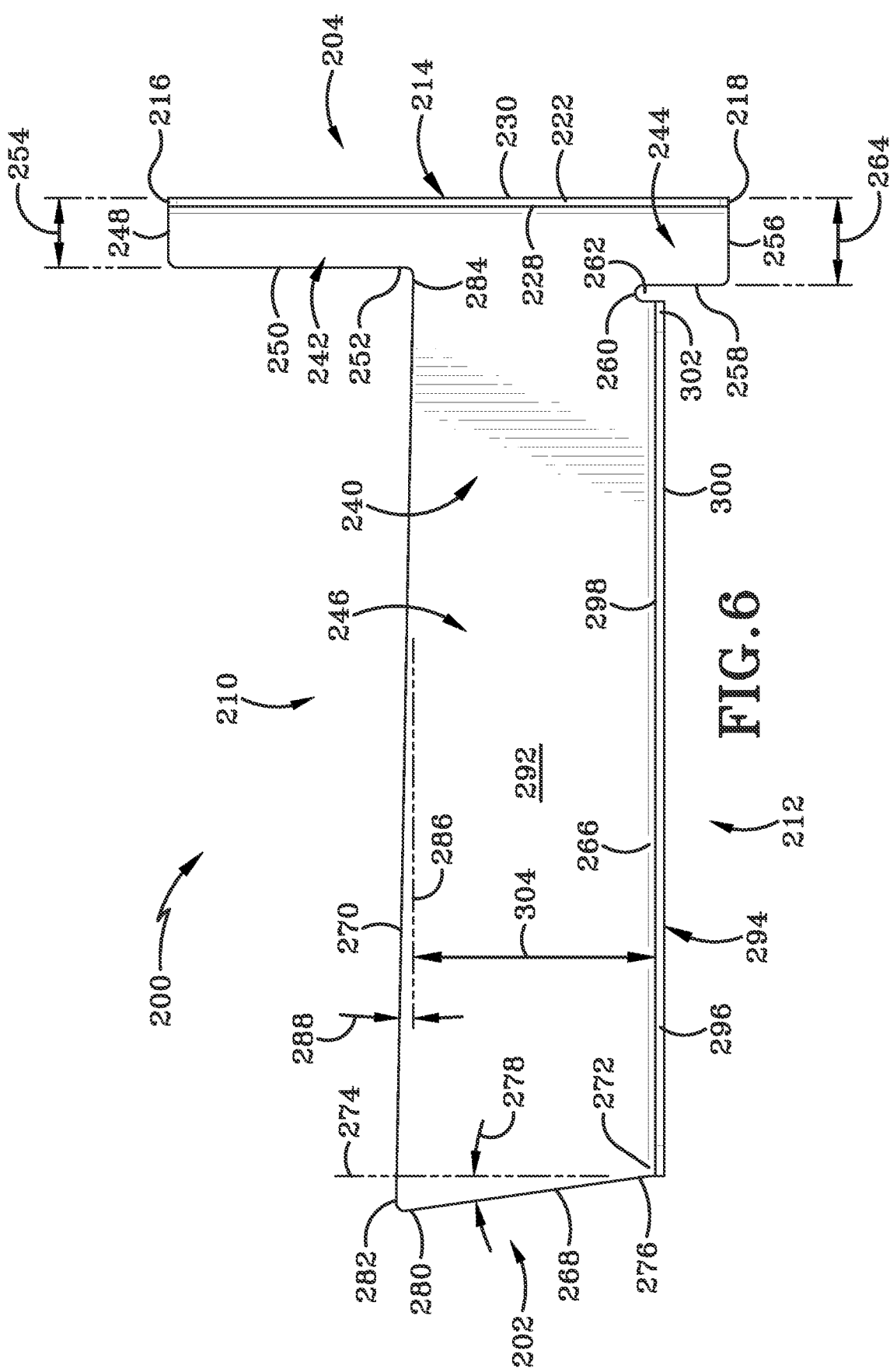

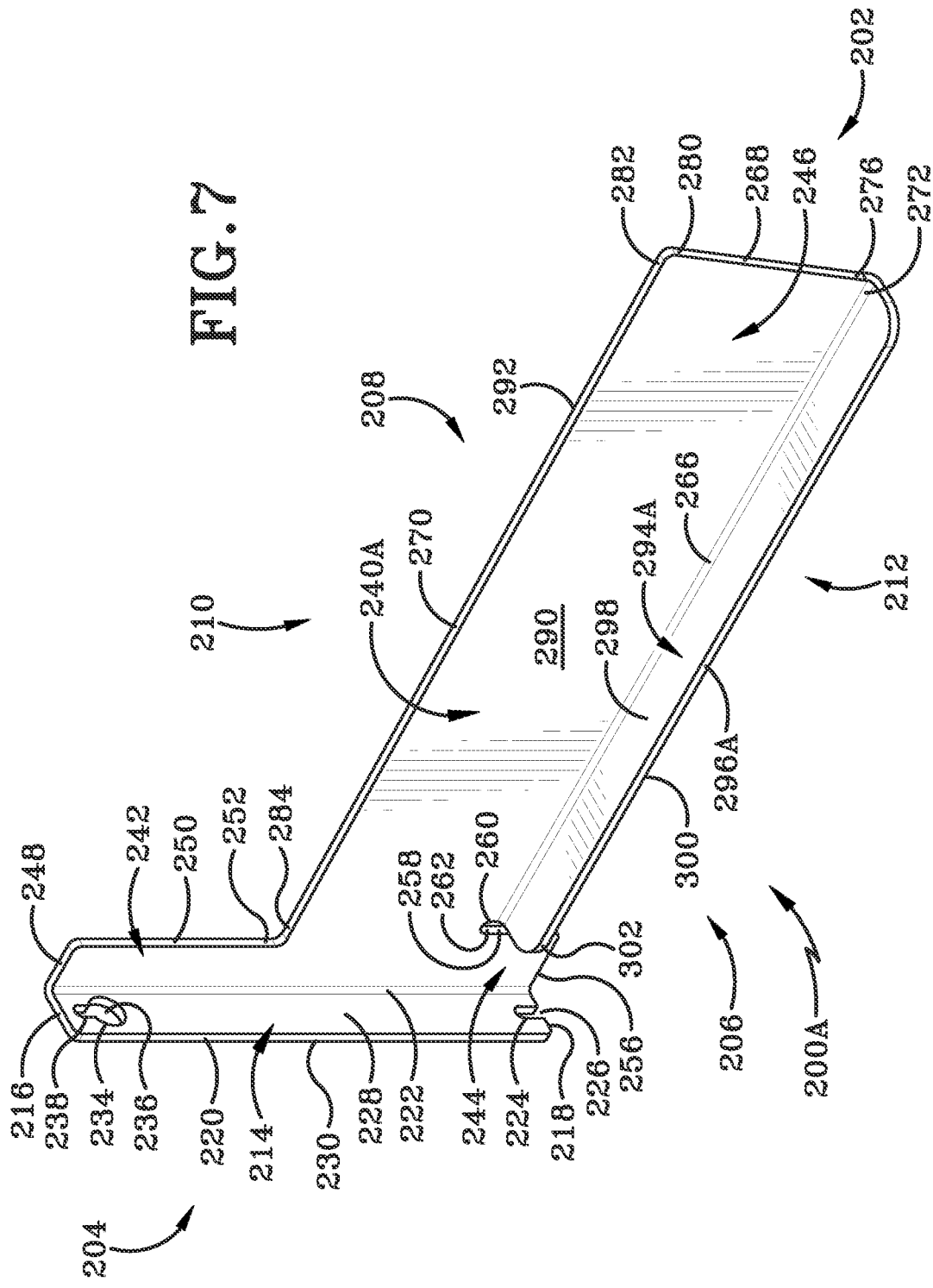

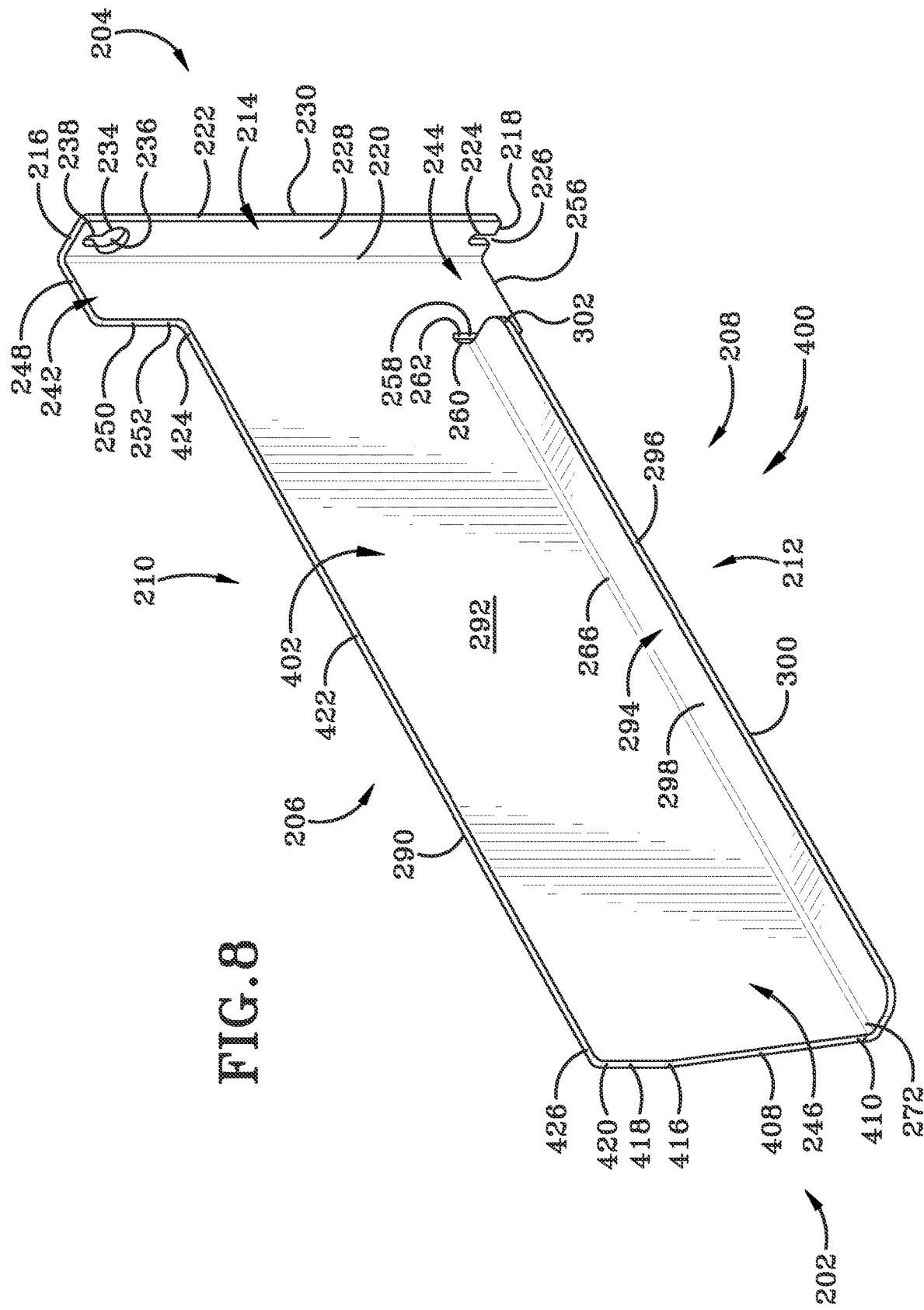

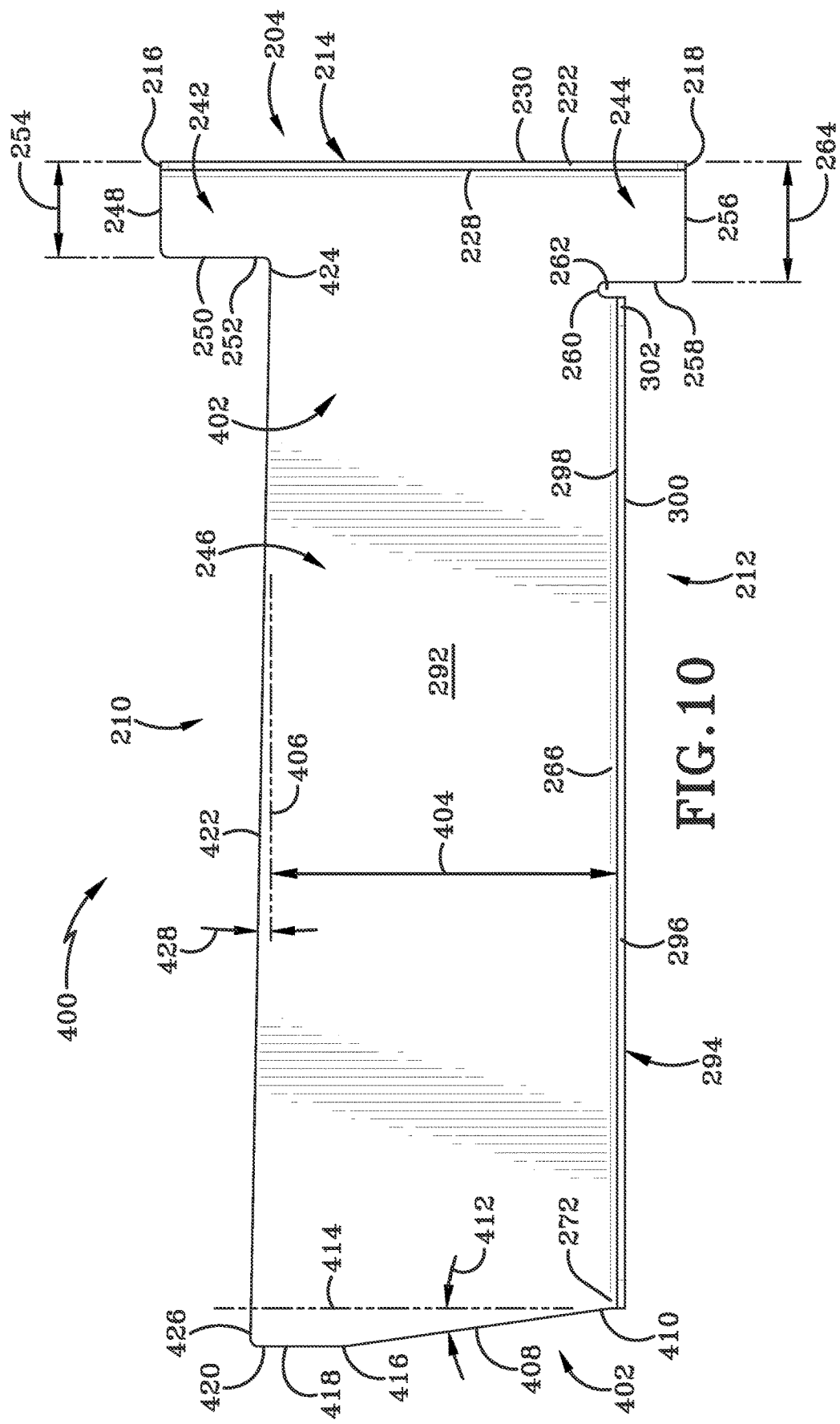

METHOD AND APPARATUS FOR STORING CLAMPS

CROSS REFERENCE TO RELATED APPLICATION

The present application is a divisional application of U.S. patent application Ser. No. 16/409,978, filed on May 13, 2019; the entirety of which is incorporated herein by reference.

TECHNICAL FIELD

The present disclosure relates generally to a tool storage device. More particularly, the present disclosure relates to a storage rack for hand tools. Specifically, the present disclosure relates to a storage rack for woodworking clamps that nest relative to each other while supported by the storage rack system to reduce the overall length or area occupied by the system when mounted to a wall or support surface.

BACKGROUND

An F-clamp, also known as a bar clamp or speed clamp and a "G-clamp", is a type of woodworking clamp. The name comes from its "F" shape. The F-clamp is similar to a C-clamp in use, but has a wider opening capacity (throat). An F-clamp, in addition to other types of clamps, is used in woodworking while more permanent attachment is effectuated with screws or glue.

An F-clamp ordinarily includes two horizontal bars (i.e., crossbars) joined together by a vertical bar. There is a large screw on the lower bar to allow for the clamp to be tightened. F-clamps are adjustable which allows for them to be used on larger scale objects without the need for a large screw.

Every woodworker has heard (or given) the same advice, "You can never have too many clamps." When a woodworker has many clamps, storing them all often takes up a significant amount of space. Some woodworkers enjoy hanging their clamps on a wall, but hanging many clamps occupies a significant surface area of the wall.

SUMMARY

A need continued to exist for hanging and storing clamps or other hand tools in an accessible, organized and condensed in as tight a space as possible. The present disclosure addresses these and other issues by providing a storage system that is variable and stores tools or clamps regardless of your clamp size, style or quantity.

In one aspect, an exemplary embodiment of the present disclosure may provide a tool storage system comprising: a bracket adapted to be mounted to a support surface; a first support arm coupled to the bracket and defining a first support arm space; and a second support arm coupled to the bracket and defining a second support arm space, wherein the first support arm is at least partially disposed within the second support arm space. This exemplary embodiment or another exemplary embodiment may further provide wherein the first support arm at least partially nests adjacent the second support arm. This exemplary embodiment or another exemplary embodiment may further provide a major portion of the first support arm having a first side surface and a second side surface; and a major portion of the second support arm having a first side surface and a second side surface, wherein the second side surface of the second support arm defines a portion of the second support arm space. This exemplary embodiment or another exemplary embodiment may further provide a major portion of the first support arm having an upper edge and a lower edge defining a first height; and a major portion of the second support arm having an upper edge and a lower edge defining a second height that is greater than the first height. This exemplary embodiment or another exemplary embodiment may further provide a length of the first support arm measured from a rear end to a forward end thereof; a length of the second support measured from a rear end to a forward end thereof, wherein the length of the second support arm is greater than the length of the first support arm. This exemplary embodiment or another exemplary embodiment may further provide a first pair of support arms, wherein the first support arm is one half of the first pair of support arms; a second pair of support arms, wherein the second support arm is one half of the second pair of support arms; and wherein the second pair of support arms are offset to one side of the first pair of support arms. This exemplary embodiment or another exemplary embodiment may further provide a first height associated with the first pair of support arms that is less than a second height associated with the second pair of support arms; and wherein the first height being lower than the second height is adapted to position a first woodworking clamp within the second support arm space. This exemplary embodiment or another exemplary embodiment may further provide a first horizontal row of apertures formed in the bracket; a second horizontal row of apertures formed in the bracket that are below the first horizontal row; and wherein the first and second support arms are connected to the bracket along a vertical plane intersecting one aperture in the first horizontal row of apertures and one aperture in the second horizontal row of apertures. This exemplary embodiment or another exemplary embodiment may further provide a first horizontal row of apertures formed in the bracket; and a row of mounting apertures formed in the bracket above, wherein a ratio of apertures from the first horizontal row to apertures in the row of mounting apertures is in a range from about 7:1 to about 12:1.

In another aspect, an exemplary embodiment of the present disclosure may provide a tool storage system comprising: a first support arm supporting a first tool; and a second support arm adjacent the first support arm and the second support arm supporting a second tool defining a first space, wherein the first tool is at least partially disposed within the first space defined by the second tool. This exemplary embodiment or another exemplary embodiment may further provide a first member on the first tool; a second member on the second tool, wherein the first member of the first tool nests with the second member in the first space defined by the second tool. This exemplary embodiment or another exemplary embodiment may further provide a first member on the first tool; a second member on the second tool defining a portion of the first space that is shaped complementary to the first member and receives the first member within the first space adapted to reduce a length or width dimension of the clamp rack system by storing the second tool in the first space defined by the second tool. This exemplary embodiment or another exemplary embodiment may further provide wherein the first tool is a first woodworking clamp and the second tool is a second woodworking clamp having a larger clamping dimension than that of the first woodworking clamp; a first bar on the first woodworking clamp; and a second bar on the second woodworking clamp defining a portion of the first space; wherein the first bar is placed within the first space adapted to reduce a dimension of the clamp rack system by storing the first woodworking clamp in the first space defined by the second tool. This exemplary embodiment or another exemplary embodiment may further provide a first edge on the first bar of the first woodworking clamp; a second edge on the second bar of the second woodworking clamp; wherein the first edge is spaced parallel to the second edge within the first space. This exemplary embodiment or another exemplary embodiment may further provide a first upper edge on the first support arm; a second upper edge on the second support arm; a first crossbar on the first woodworking clamp supported by the first upper edge; a second crossbar on the second woodworking tool supported by the second upper edge; wherein the second crossbar is vertically above the first crossbar in the first space. This exemplary embodiment or another exemplary embodiment may further provide a first pair of support arms, wherein the first support arm is one half of the first pair of support arms; and a second pair of support arms, wherein the second arm is one half of the second pair of support arms; wherein the second pair of support arms are offset to one side of the first pair of support arms. This exemplary embodiment or another exemplary embodiment may further provide a first height associated with the first pair of support arms that is less than a second height associated with the second pair of support arms; wherein the first height being lower than the second height is adapted to position the first woodworking clamp within the first space defined by the second woodworking clamp. This exemplary embodiment or another exemplary embodiment may further provide a first clamp bar on the first tool; a second clamp bar on the second tool; a bracket connected to the first and second support arms, wherein the bracket has first and second ends; wherein the second clamp bar is closer the first end of the bracket; a cross bar on the second tool, wherein a terminal end of the cross bar is closer the second end of the bracket than an edge of the first clamp bar. This exemplary embodiment or another exemplary embodiment may further provide a bracket connected to the first and second support arms; a horizontal row of apertures formed in the bracket; wherein the first and second support arms are connected to the bracket along the horizontal row of apertures; and an upper edge on the first support arm that is lower than an upper edge of the second support arm.

In another aspect, an exemplary embodiment of the present disclosure may provide a method for storing tools comprising: connecting a first support arm to a first bracket mounted to a support surface; connecting a second support arm to the first bracket adjacent the first support arm; hanging a first tool on the first support arm; hanging a second tool on the second support; nesting the first tool within a space defined by the second tool on the second support arm. This exemplary embodiment or another exemplary embodiment may further provide orienting a first bar on the first tool parallel to a second bar on the second tool within the space defined by the second tool. This exemplary embodiment or another exemplary embodiment may further provide connecting the first support arm and the second support arm to a common row of horizontal apertures formed in the bracket. This exemplary embodiment or another exemplary embodiment may further provide disposing an upper edge on a major portion of the first support arm and a lower vertical height than an upper edge on a major portion of the second support arm. This exemplary embodiment or another exemplary embodiment may further provide defining a first pair of support arms by connecting a support arm similar to the first support arm but having a lower arm that extends in an opposite direction than that of the first support arm; defining a second pair of support arms by connecting a support arm similar to the second support arm but having a lower arm that extends in an opposite direction than that of the second support arm; and disposing the second pair of support arms offset to one side of the first pair of support arms. This exemplary embodiment or another exemplary embodiment may further provide hanging the first tool on the first pair of support arms; and hanging the second tool on the second pair of support arms, wherein the first tool nests with the first tool while hung on the first pair of support arms. This exemplary embodiment or another exemplary embodiment may further provide providing a second bracket having an arcuate cutout formed in an edge of the second bracket; aligning a first end of the second bracket with a second end of the first bracket; and defining an aperture with the arcuate cutout in the second bracket and a corresponding arcuate cutout in an edge of the first bracket. This exemplary embodiment or another exemplary embodiment may further provide orienting a first clamp bar on the first tool closer to a first end of the first bracket than a terminal end of a cross bar on the second tool that oriented closer towards a second end of the first bracket.

In another aspect, an exemplary embodiment of the present disclosure may provide a tool storage system has a universal mounting bracket coupled to a support surface formed with a plurality of apertures that align with differently sized support arms that support a tool therefrom. The apertures are aligned along a common horizontal plane and the support arms have different heights that allow tools to be hung therefrom in a nesting relationship so that more tools can occupy less space or area relative to the support surface. The nesting relationship of the tools provides for a first tool supported by the first arm to fit within a space defined by the second tool supported by the second arm. In some instance, the first and second arms may be part of a pair of support arms, respectively.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIG. 6 is a side elevation view of the first support arm.

FIG. 7 is a perspective view of a variant of the first support arm having some components oriented in an opposite direction than the first support arm shown in FIG. 4-FIG. 6.

FIG. 8 is a perspective view of a second support arm for the tool storage system.

FIG. 10 is a side elevation view of the second support arm.

Similar numbers refer to similar parts throughout the drawings.

DETAILED DESCRIPTION

Figure 1:
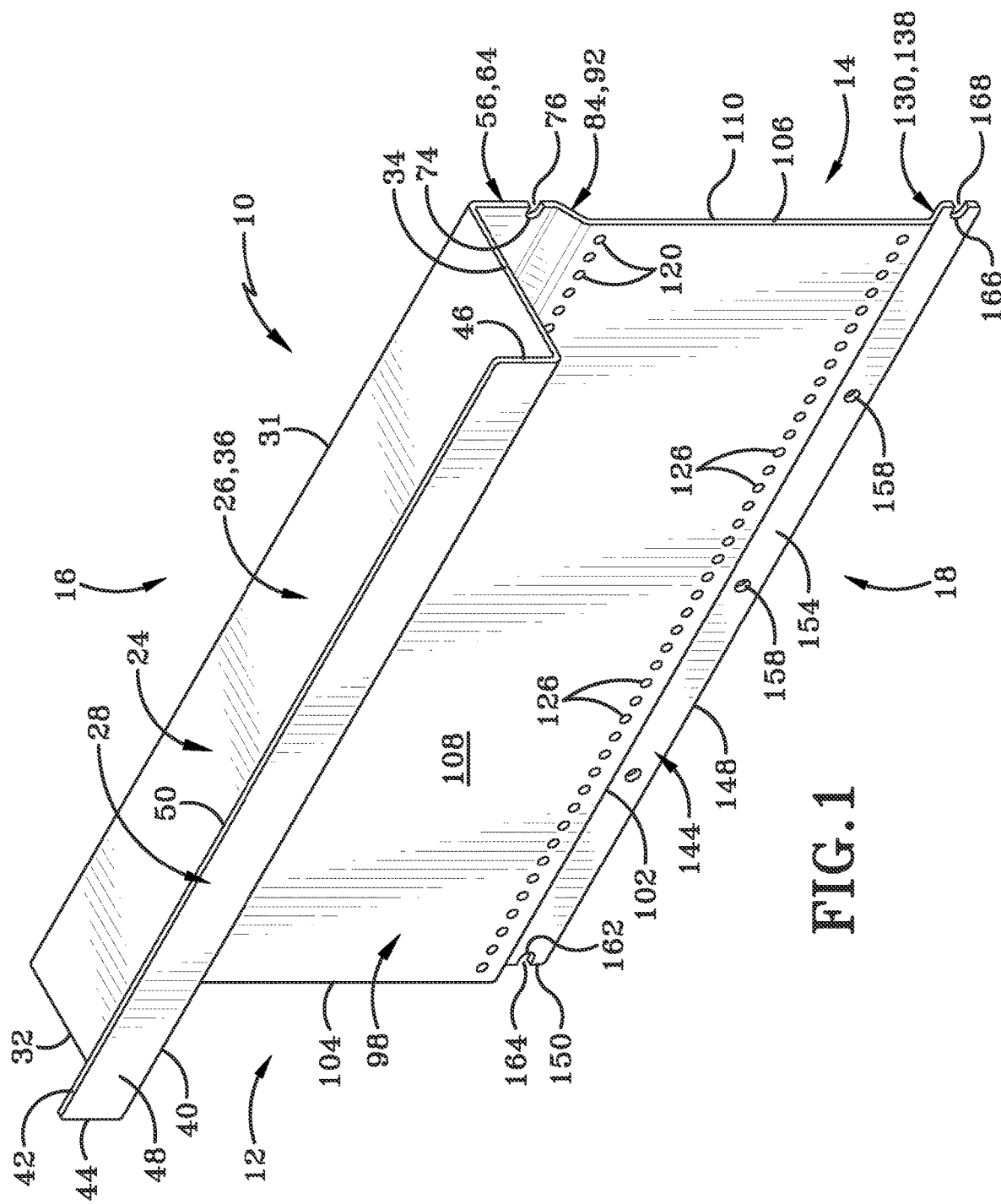
FIG. 1 is a front perspective view of a bracket for a tool storage system.
Figure 2:
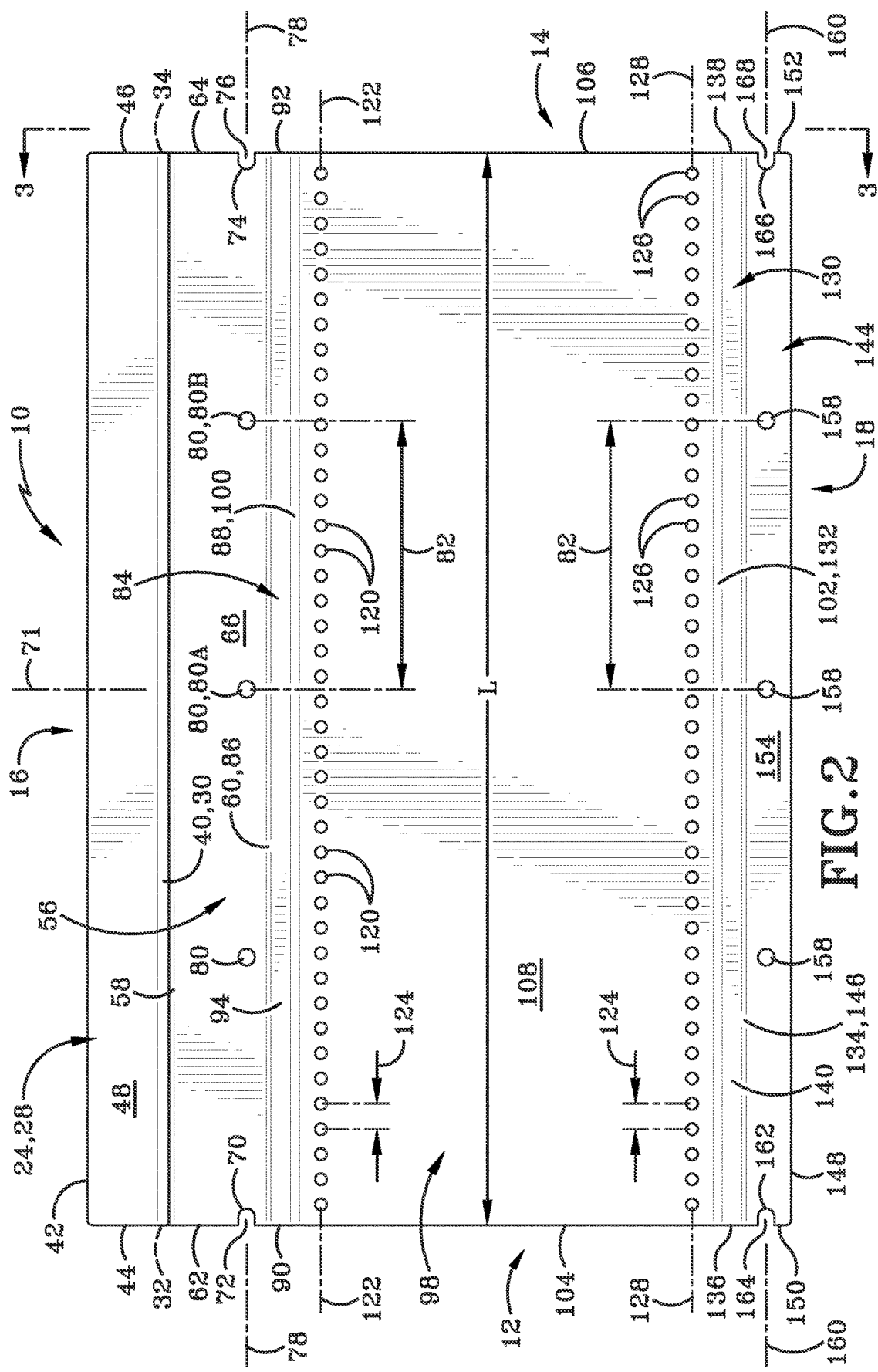
FIG. 2 is a front elevation view of the bracket.
Figure 3:
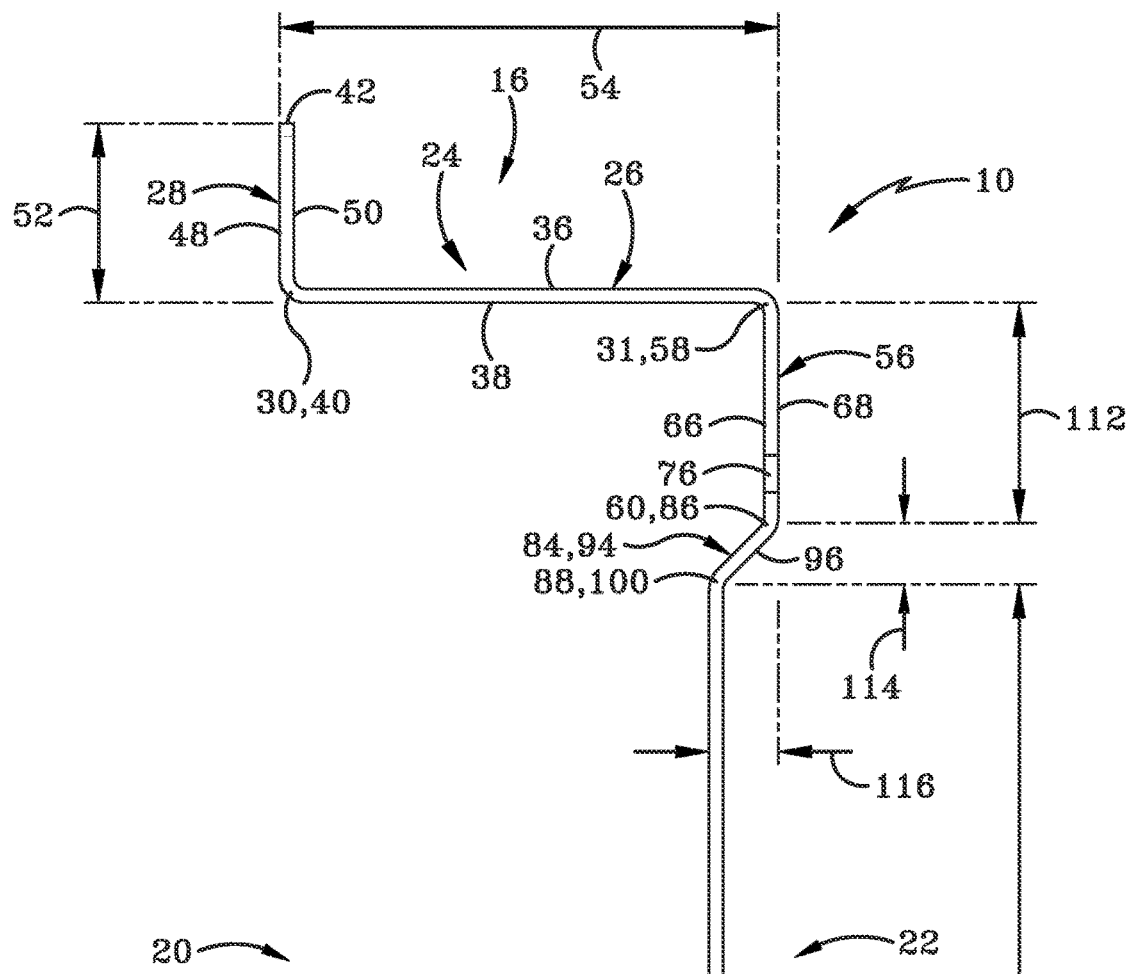
FIG. 3 is a side elevation view of the bracket taken along line 3-3 in FIG. 2.

FIG. 1-FIG. 3 depict a bracket, shown generally at 10 for use in a clamp mounting or clamp hanging system which is described in greater detail below. Bracket 10 includes a first or left side 12 opposite a second or right side 14 defining a longitudinal direction therebetween. Bracket 10 includes a top 16 opposite a bottom 18 defining a vertical direction therebetween. Bracket 10 includes a front side 20 opposite a rear side 22 defining a transverse direction therebetween. The transverse direction is orthogonal to the longitudinal direction and orthogonal to the vertical direction.

Bracket 10 is unibody member formed from a substantially rigid material. The tool body may be a unibody that is integrally extruded, molded, removably machined, additive manufactured, or formed as a unitary, monolithic member substantially fabricated from a rigid, manmade, material. In one example, metal or metal alloys, such as stainless steel or aluminum alloy, may form a substantial majority of the components or elements used to fabricate the tool body and the various components integrally formed, molded, or extruded therewith. The rigid bracket 10 should withstand typical woodworking handling from an operator mounting the bracket 10 to a support surface, such as a wall, and hanging/storing woodworking clamps thereon. While it is contemplated that the bracket 10 described herein is uniformly and integrally extruded, molded, removably machined, additively manufactured, or formed, it is entirely possible that the components of the tool body be formed separately from alternative materials as one having routine skill in the art would understand. In another example, the bracket 10 may be formed from a rigid elastomeric material or rubber material configured to withstand deformation while supporting clamps hung by the operator (i.e., a woodworker). Furthermore, while the components of the bracket 10 are discussed below individually, it is to be clearly understood that the components and their corresponding reference elements of the tool body are portions, regions, or surfaces of the body and all form a respective element or component of the unitary body of bracket 10. Thus, while the components may be discussed individually and identified relative to other elements or components of the tool body, in this exemplary embodiment, there is a single bracket body having the below described portions, regions, or surfaces.

Having thus indicated that the bracket 10 may be formed from a singular piece of metallic or other rigid material, its respective portions or components of the unitary bracket body will be described in greater detail below.

Beginning with the top 16, bracket 10 includes an upper shelf 24 having a transversely aligned leg 26 and a vertically aligned leg 28. Transversely aligned leg 26 of the shelf 24 includes a forward end 30 and a rear end 31. Transverse leg 26 further includes a first side edge 32 and a second side edge 34. Collectively, the forward end 30, the rear end 31, the first side edge 32, and the second side edge 34 bound and upwardly facing top surface 36 and a downwardly facing bottom surface 38 of the shelf 24.

The vertical leg 28 extends upwardly from a rigid connection with the transverse leg 26. In one particular embodiment, vertical leg 26 extends upwardly from the upper surface 36 of transverse leg 26 adjacent its forward end 30. In another particular embodiment, a lower end 40 of the vertical leg 28 is rigidly secured to the forward end 30 of the transverse leg 26. The vertical leg 28 may extend upwardly in a vertical manner to a terminal top end 42. Vertical leg 28 may further include a first side edge 44 opposite a second side edge 46. Collectively, the lower end 40, the top end 42, the first side edge 44, and the second side edge 46 bound a frontal surface 48 which is opposite a rear surface 50 of the first leg 28. The front surface 48 may be offset parallel to the rear surface 50. In one particular embodiment, the front and rear surfaces 48, 50 of the vertical leg 28 are oriented orthogonally to the top and bottom surfaces 36, 38 of the transverse leg 26 on shelf 24. Further, the vertical height associated with the vertical leg 28 which is represented by dimension 52, may be in a range from about ½ inch to about 2 inches. However, in one particular embodiment, the height of the vertical leg 28 of shelf 24 is about 1 inch. The transversely aligned width of the leg 26 of shelf 24, which is represented by dimension 54, is in a range from about 2 inches to about 4 inches. In one particular embodiment, the transversely aligned width of the transverse leg 26 is about 3 inches. Thus, a ratio of width 54 to height 52 may be in a range from about 2:1 to about 4:1. Further, the particularly shown embodiment provides a ratio of about 3:1. In one particularly embodiment, the ratio range may be advantageous to ensure that the shelf 24 extends outwardly far enough to support secondary components thereon, such as bottles of wood glue or other relatively small items that a woodworker uses in conjunction with wood clamps.

Bracket 10 further includes an upper wall 56 that extends vertically downward from the lower surface 38 of transverse leg 26 adjacent its rear end 31. Upper wall 56 includes an upper end 58 that is in substantially continuous contact with the rear end 31, and a lower end 60 which is positioned vertically below its upper end 58. Upper wall 56 further includes a first side edge 62 and a second side edge 64. Collectively, the upper end 58, the lower end 60, the first side edge 62, and the second side 64 bound a forward or front surface 66 of the upper wall 56 which is opposite a rear surface 68 of the upper wall 56. Front surface 66 is positioned rearwardly relative to rear surface 50 on vertical leg 28 but is offset parallel thereto. Accordingly, front surface 66 is oriented orthogonally to the lower surface 38 of the transverse leg 26 of the upper shelf 24.

First side edge 62 of the upper wall 56 is interrupted by an arcuate cutout 70. In one particular embodiment, arcuate cutout 70 is semicircular extending or forming an approximately 180 degree radius of curvature between its upper end and its lower end that are continuous with the first side edge 62. The curvature of the arcuate cutout extends towards the second side 14 so as to define a cutout region 72 that extends inwardly towards a vertical midline 71 of the bracket 10. Similarly, a second arcuate cutout 74 defining a second cutout region 76 is formed in the second side edge 64 of the upper wall 56. The second arcuate cutout edge 74 extends towards the vertical midline 71 of the bracket 10 which is also in the same direction as towards the first side edge 62 of the upper wall 56. In one particular embodiment, the respective centers of the arcuate cutout region 72 and the arcuate cutout region 76 lie along the same transverse plane 78. As will be described in greater detail below, the semicircular arcuate cutout edges 70, 72 extending towards the vertical midline 71 of the bracket 10 enable bracket 10 to be positioned side-by-side with another similarly shaped bracket such that the when the two brackets are aligned side-to-side the arcuate cutout edge along the first side edge 62 aligns with another arcuate cutout on a second side edge of the additional bracket wherein the two semicircular arcuate cutout edges are aligned to define a complete circular aperture to allow a single connector, such as a screw and washer to mount both brackets to a stud behind a support surface.

Upper wall 56 may further define a plurality of transversely aligned through apertures 80. In one particular embodiment, apertures 80 are transversely aligned along the transverse plane 78. In one particular embodiment, there may be a first aperture 80A and a second aperture 80B that are separate by a longitudinally aligned length 82 that is equal to about 4 inches. Further, in another particular embodiment, each of the apertures 80 that extend transversely through the upper wall 56, may be longitudinally spaced approximately 4 inches as represented by dimension 82 from an adjacent aperture 80 in the upper wall 56. In one exemplary embodiment, an advantage for providing the apertures 80 at 4-inch intervals is to enable the bracket to be threadably mounted/connected to a rear substrate or support surface, such as a wall, by inserting a screw or fastener through the apertures into a stud. Since studs in a wall are often offset at 16-inch intervals, which may be referred to as "sixteen inches on center," the 4-inch interval dimension 82 enables and ensures that when a screw or other fastener is inserted through one aperture 80, then another aperture that is located remotely along the same transverse plane 78 towards either the first side 12 or towards the second side 14 will align with another stud located approximately 16 inches from the first stud. In one particular embodiment, the transverse plane 78 intersecting the center of each aperture 80 and each cutout region 72, 76 is disposed closer to the bottom end 60 of the upper wall 56 than the top end 58 of the upper wall 56. More particularly, transverse plane 78 is located within the lower half of the upper wall 56. By locating the transverse plane 78 in the lower half of the upper wall 56, this should enable a sufficient amount of room or clearance below the bottom surface 38 of the transverse leg 26 of the upper shelf 24 to ensure that the screws or other fasteners may be inserted through the apertures 80 leaving a sufficient amount of space for a tool or hand to rotatably move below the bottom surface 38 of the upper shelf 24 to fasten the screw or fastener/connector to a stud in the wall or substrate located rearwardly from the rear surface 68 of the upper wall 56.

With continued reference to the upper wall 56, the vertical height of the upper wall 56 is defined between its upper end 58 and its lower end 60. In one particular embodiment, the vertical height associated with the upper wall 56 measured between its upper end 58 and its lower end 60 is in a range from about 1 inch to about 3 inches. In one particular embodiment, the vertically aligned height of the upper wall 56 as represented by dimension 112 is about 1½ inches.

A first angled wall 84 includes an upper end 86 and a lower end 88. First angled wall 84 further includes a first side edge 90 and a second side edge 92. Collectively, the upper end 86, the lower end 88, the first side edge 90, and the second side edge 92 bound an upwardly facing front surface 94 and a downwardly facing rear surface 96. The first angled wall 84 is angled at approximately 45 degrees relative to a vertical axis. Stated otherwise, the front surface 94 of angled wall 84 is approximately 135 degrees from front surface 66 of the upper wall 56. Upper end 86 is connected via a rigid connection with the lower end 60 of the upper wall 56. Angled wall 84 extends downwardly and forwardly from the upper end 86 towards the lower end 88. Accordingly, the lower end 88 of the angled wall 84 is positioned forwardly from front surface 66 of the upper wall 56. However, the distance and angle in which the angled wall 84 extends forwardly does not exceed the width 54 of the transverse leg 26. Accordingly, the lower end 88 of the angled wall 84 is positioned rearwardly relative to rear surface 50 of vertical leg 28 on the upper shelf 24.

The vertical height, represented by dimension 114 of the first angled wall 84 from the upper end 86 to the lower end 88 is approximately ½ inch. The dimension 116 associated with the transversely aligned width at which the first angled wall 84 extends forwardly is in a range from about ¼ inch to about 1 inch, and in one particular embodiment dimension 116 is ½ inch. Because first angled wall 84 is angled at an approximately 45 degree angle relative to the upper wall 56 and the central wall 98 (discussed below), the dimension 114 and the dimension 116 associated with the vertical height and transverse width of first angled wall 84 should be equal.

A central wall 98 includes an upper end 100 and a lower end 102. Central wall 98 further includes a first side edge 104 and a second side edge 106. Collectively, upper end 100, lower end 102, first side edge 104, and second side edge 106 bound a front surface 108 of the central wall 98 and a rear surface 110 of the central wall 98. Central wall 98 extends downwardly in a vertical manner from a rigid connection at its upper end 100 with the lower end 88 of the first angled wall 84. Inasmuch as the central wall is vertical or nearly vertical, the forward surface 108 is offset substantially parallel and forwardly from the front surface 66 of the upper wall 56 and orthogonal with the lower surface 38 of the transverse leg 26 of upper shelf 24. Further, the rear surface 110 of the central wall 98 is offset parallel to the front surface 66 of the upper wall 56. In one particular embodiment, the rear surface 110 of the central wall 98 is positioned forwardly from the front surface 66, the upper wall 56 based on the offset bias due to the angled connection effectuated by first angled wall 84. Central wall 98 has a vertical height represented by dimension 118 measured from its upper end 100 to its lower end 102 that is in a range from about 5 inches to about 8 inches. However, in one particular embodiment, the vertical height, as represented by dimension 118, of the central wall 98 is about 6 inches.

Central wall 98 defines a first row of apertures 120 that are centered along transverse plane 122. The plurality of apertures 120 extend entirely through the central wall 98 from its front surface 108 to its rear surface 110. Apertures 120 have a smaller diameter than apertures 80 formed in the upper wall 56. Additionally, transverse plane 122 is positioned vertically lower than the first transverse plane 78. In one particular embodiment, the vertical height or dimension between the transverse plane 122 and transverse plane 78 is about 1.25 inches. However, the dimension between plane 78 and plane 122 may be any distance in a range from about ½ inch to about 2 inches. Additionally, there may be significantly more apertures 120 than there are apertures 80. As will be described in greater detail below, apertures 120 are configured to connect with support arms used for storing clamps and are not used to mount the bracket 10 to a vertical substrate. Accordingly, smaller screws or fasteners having a narrower diameter may be used to attach the support arms so they may extend outwardly in a cantilevered manner from the front surface 108 of the central portion 98 as will be described in greater detail below. The number of the plurality of apertures 120 may be on the order of 7 to 12 times greater than the number of apertures 80 formed in the bracket 10. Stated otherwise, a ratio of apertures 120 to apertures 80 may be in a range from about 7:1 to about 12:1. In one particular embodiment, there are approximately ten apertures 120 for every single aperture 80 (i.e., a ratio of 10:1 of apertures 120 to apertures 80). As such, apertures 120 are spaced significantly closer together than apertures 80 as represented by dimension 82. In one particular embodiment, apertures 120 are spaced longitudinally apart from each other as represented by dimension 124, a distance of about 0.35 inches.

Central wall 98 may further define a second row of apertures 126 that are aligned along a transverse plane 128 that is offset parallel to transverse plane 122. The plurality of apertures 126 formed in a second longitudinal row are positioned vertically below the first row of apertures 120. However, number of apertures in the lower row of apertures 126 may equal that of the number of apertures formed in the upper row of apertures 120. The vertical distance between plane 122 and plane 128 may be in a range from about 4 inches to about 6 inches. However, in one particular embodiment, the vertical height between first transverse plane 122 and second transverse plane 128 is approximately 5.5 inches. Further, each aperture 126 in the lower row must be vertically aligned with a corresponding aperture in the upper row of apertures 120. As such, the dimensional distance 124 is the same between adjacent apertures in the lower row of apertures 126 as it is in the upper row of apertures 120. As will be described in greater detail below, the support arms that extend outwardly in a cantilevered manner from the front surface 108 of the central wall 98 are attached via screws or fasteners and the support arms need to be vertically aligned such that two screws or fasteners in vertical alignment are used to connect an upper end of a mounting portion of a support arm with a lower end of a mounting portion of a support arm such that the support arm extends outwardly in a cantilevered manner and is vertically aligned so as to prevent clamps from sliding off of their respective support arm.

Figure 13:
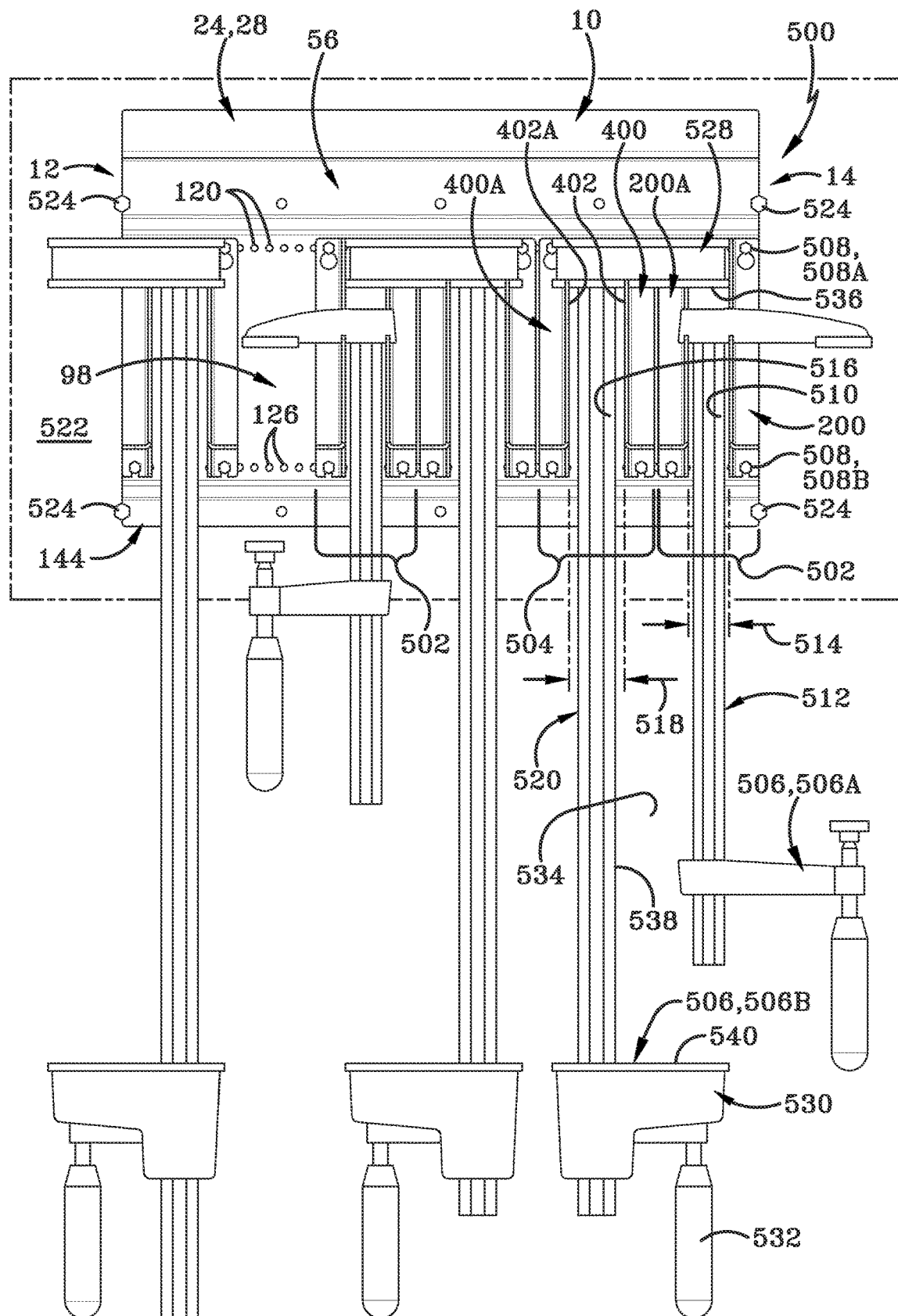
FIG. 13 is a front elevation view of the support arms of the tool storage system supporting tools, such as woodworking clamps, in a nested orientation to increase the number of tools that may be hung on the support arms within a limited area of wall space.

Bracket 10 includes a longitudinally aligned length L that is measured from the first end 104 to the second end 106 of the central wall 98. The length L of bracket 10 may be fixed inasmuch as bracket 10 is a unibody member. However, the length L of the bracket 10 may be any suitable length depending on the number of woodworking clamps that need to be supported by bracket 10. In one particular embodiment, the length L of bracket 10 is in a range from about eight inches to about thirty-six inches. However, it may be advantageous for the length L of bracket 10 to be an equal number, such as eight inches, ten inches, twelve inches, fourteen inches, sixteen inches, eighteen inches, twenty inches, twenty-two inches, twenty-four inches, twenty-eight inches, thirty inches, thirty-two inches, thirty-four inches, or thirty-six inches. This even-numbered length can help ensure that when two brackets are aligned sided-by-side (as shown in FIG. 13) that the circular apertures collectively formed by the arcuate edges 74, 70, and 166, 164, respectively, should align over a stud behind a support surface or wall.

Bracket 10 further includes a second angled wall 130 having an upper end 132 and a lower end 134, and first side edge 136, and second side edge 138. Collectively, the upper end 132, the lower end 134, the first side edge 136, and the second side edge 138 bound a downwardly facing front surface 140 and an upwardly rear facing surface 142. Second angled wall 130 extends downwardly and rearwardly from a rigid connection with the lower end 102 of the central wall 98. In one particular embodiment, the second angled wall 130 is angled at the same angle relative to the central wall 98 as the first angled wall 84. Thus, when the first angled wall 84 is positioned or oriented at approximately 45 degrees relative to the central wall 98, similarly the second angled wall 130 is oriented at 45 degrees relative to the central wall 98. Thus, the dimensions at which the second angled wall 130 extend in the transverse direction corresponds to or equals dimension 116 and the dimension at which the second angled wall 130 extends in the vertical direction corresponds to dimension 114.

A lower wall 144 includes an upper end 146 opposite a lower end 148, and first side edge 150 and a second side edge 152. Collectively, upper end 146, lower end 148, first side edge 150, and second side edge 152 bound and define a front surface 154 and opposite second rear surface 156. Lower wall 140 defines a plurality of lower apertures 158 that lie along a plane 150,160. Lower transverse plane 160 is parallel to the upper plane 78 and is spaced apart vertically from the upper plane in a range from about 7 inches to about 9 inches. In one particular embodiment, the vertical height between plane 78 and lower plane 160 is about 7.75 inches. Each aperture 158 formed in the lower wall 140 is vertically lined with a corresponding aperture 80 in the upper wall 56. As will be described in greater detail below, when the bracket 10 is mounted to a substrate through connectors (screws or fasteners) being inserted into studs in a wall, it is desirable to mount an upper screw or fastener through the apertures 80 and a corresponding lower screw or fastener through the apertures 158 so that the bracket 10 may be level relative to the wall. Similar to the upper wall 56, the first side edge 150 of the lower wall 140 includes an arcuate cutout edge 162 defining a cutout region 164. The arcuate cutout edge 162 extends towards the vertical centerline of the bracket 10 define a hemispherical cutout region 164 that approximates a 180 degrees. Similarly, an inwardly extending cutout edge 166 defines a cutout region 168 in the second side edge 152 in a similar semi-circular fashion. As described above and in further detailed below, the arcuate cutout edges aligned with a corresponding cutout edge in the lower wall 140 of another bracket 10 when the other bracket is aligned side by side so as to form a substantially circular aperture at the union of the two brackets. The vertical height represented by dimension 170 of the lower wall 144 is in a range from about ½ inch to about 1 inch. In one particular embodiment, the vertical height 170 of the lower wall 144 is about 0.75 inches. In order for the bracket 72 to be mounted flushly with the wall, the rear surface 68 of the upper wall 56 is coplanar along a vertical plane with the rear surface 156 of the lower wall 144.

Figure 4:
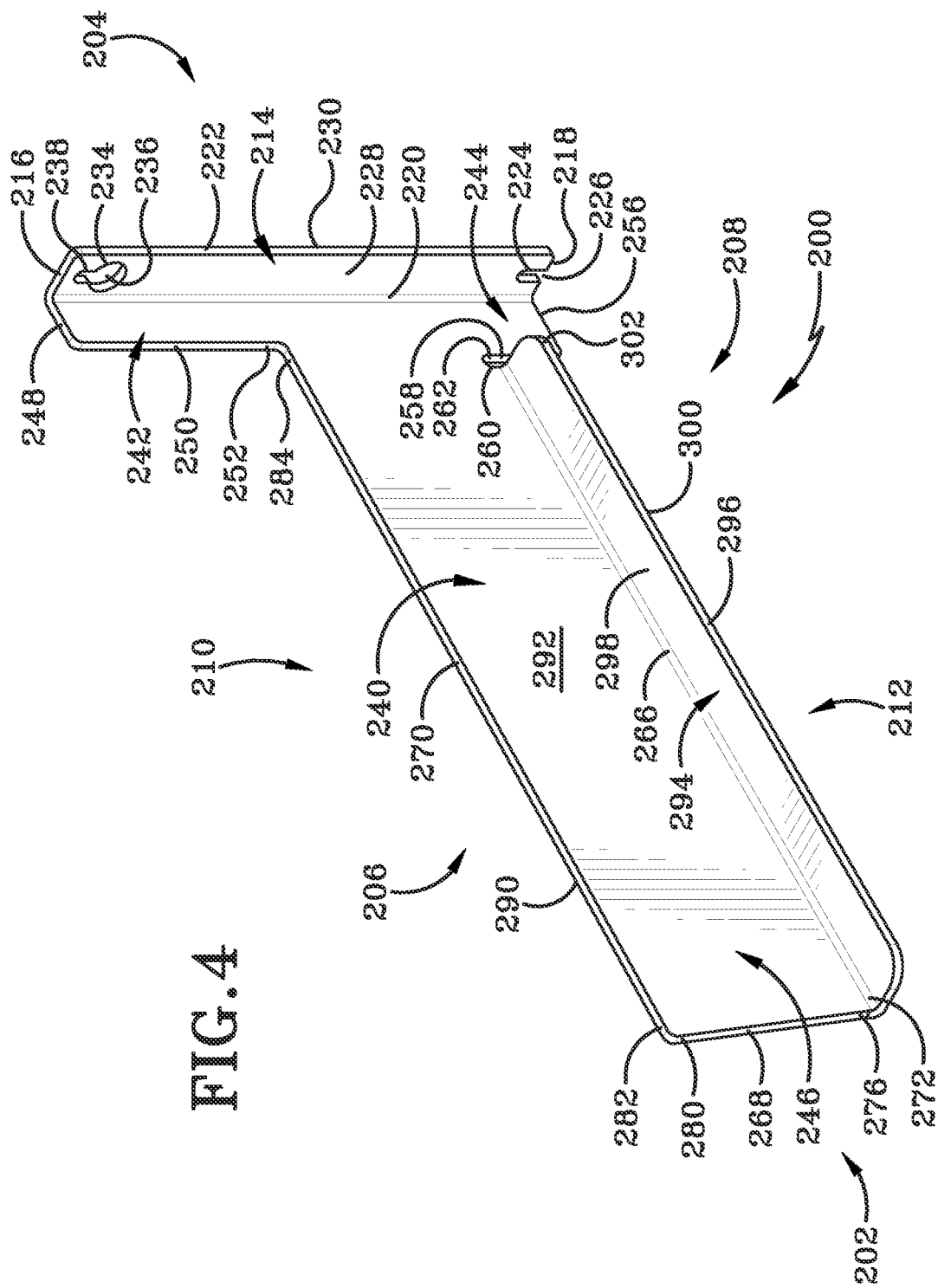
FIG. 4 is a perspective view of a first support arm for the tool storage system.
Figure 5:
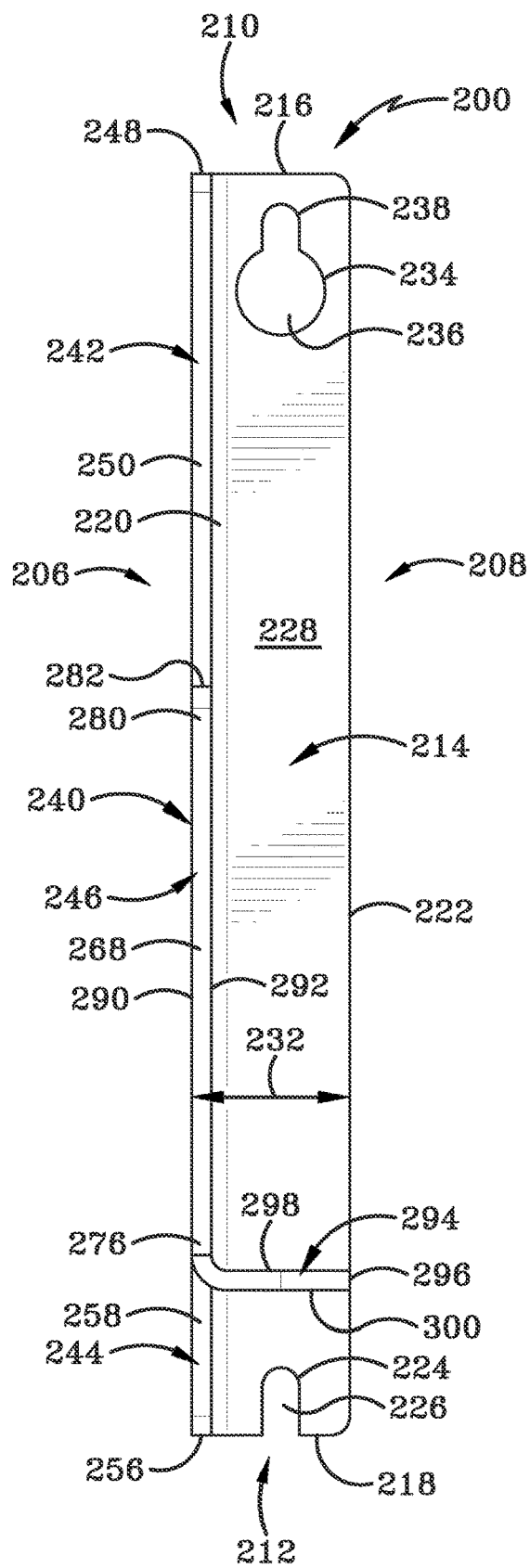
FIG. 5 is an end elevation view of the first support arm.

FIG. 4-FIG. 6 depict an exemplary support arm or support member at 200 that is configured to connect with bracket 10 as will be described in greater detail below. Further, support arm 200 is one of a plurality of support arms 200 connected to bracket 10 in a specific manner or configuration that enables the bracket 10 and plurality of support arms 200 to form a woodworking system for supporting clamps 506 (FIG. 13) thereon. More particularly, the plurality of support arms 200 enable the clamps 506 (FIG. 13) to hang in a specific orientation so as to maximize the number of clamps 506 that may be supported or carried by the system while minimizing an area on a wall or substrate 522 (FIG. 13) to which the bracket 10 and support arm 200 are mounted. In one particular embodiment, the support arms 200 arranged in a specific configuration as described below enable a maximum amount of clamps 506 to be hung on the support arms 200 while minimizing the longitudinal distance or length L.

One exemplary support arm 200 includes a front end 202 opposite a rear end 204. The direction from the front end 202 to the rear end 204 of support arm 200 is associated with the same transverse direction of the bracket 10 extending from the front 20 to the rear 22 of the bracket 10. Support arm 200 further includes a first side 206 opposite a second side 208 that defines a direction therebetween that is associated with the same direction as that of the bracket 10 defined between the first side 12 and the second side 14. Support arm 200 includes a top end 210 opposite a bottom end 212 that are aligned in the vertical direction similar to that of bracket 10. Support arm 200 is a substantially unitary unibody monolithic member formed from a rigid material. In one particular embodiment, support arm 200 is formed from metal in order to provide sufficient rigidity and strength to hang woodworking clamps 506 thereon.

The support arm 200 may be a unibody that is integrally extruded, molded, removably machined, additively manufactured, or formed as a unitary, monolithic member substantially fabricated from a rigid, manmade, material. In one example, metal or metal alloys, such as stainless steel or aluminum alloy, may form a substantial majority of the components or elements used to fabricate support arm 200 and the various components integrally formed, molded, removably machined, additively manufactured, or extruded therewith. The support arm 200 should withstand typical woodworking handling from an operator pressing hanging claims thereon while support 200 is connected to bracket 10. While it is contemplated that the support arm 200 is uniformly and integrally extruded, molded, removably machined, additively manufactured, or formed, it is entirely possible that the components of the tool body be formed separately from alternative materials as one having routine skill in the art would understand. In another example, the support arm 200 may be formed from a rigid elastomeric material or rubber material configured to withstand deformation while supporting woodworking clamps hung by the operator (i.e., a woodworker). Furthermore, while the components of the support arm 200 are discussed below individually, it is to be clearly understood that the components and their corresponding reference elements of the support arm 200 are portions, regions, or surfaces of the body and all form a respective element or component of the unitary tool body. Thus, while the components may be discussed individually and identified relative to other elements or components of the support arm 200, in this exemplary embodiment, there is a single support arm 200 having the below described portions, regions, or surfaces.

Support arm 200 includes a rear wall 214 having a top edge 216 opposite a bottom edge 218. Rear wall 214 further includes a first side edge 220 and a second side edge 222. First side edge 220 and second side edge 222 extend substantially parallel to each other in the vertical direction. Top edge 216 is substantially perpendicular to the first and second side edges 220, 222. Top edge 216 extends between the upper ends of the first and second side edges 220, 222. Bottom edge 218 extends generally perpendicularly to the first and second side edges 220, 222 adjacent their lower ends. Bottom edge 218 is interrupted by an upwardly extending arcuate cutout edge 224 defining a downwardly concave arcuate cutout region 226. Collectively, edges 216, 218, 220, 222, and 224 define and bound a front surface 228 and a rear surface 230 of the rear wall 214. A width 232 of the rear wall 214 is defined between first side edge 220 and second side edge 222. The width 232 of the support arm 200 is aligned in the same direction as that which extends between first end 12 and second end 14 of bracket 10. Stated otherwise, the width 232 of support arm 200 is aligned with the longitudinal direction of bracket 10. In one particular embodiment, width 232 of support arm 200 may be in a range from about one quarter inch to about one inch. However, one particular embodiment provides that the width 232 of the rear wall 214 is about one-half inch. Rear wall 214 may include a keyway edge 234 defining a keyway aperture 236 extending entirely through the rear wall 214 from its front surface 228 to its rear surface 230. Keyway edge 234 includes a narrowed vertically upward extension having two generally parallel edges connected with a rounded upper edge and a lower generally circular portion having an enlarged diameter relative to the upper extension. As will be described in greater detail below, the enlarged lower portion of the keyway opening or aperture 236 enables a screw or other cylindrical connector be inserted through the lower portion of the keyway opening 236 and then for the support arm 200 to be moved downwardly relative to the vertical direction such that the connector slides upwardly into the upper slotted extension or upper portion 238 having the narrowed diameter relative to the lower circular potion. The upper portion 238 of the keyway edge 234 is a downwardly concave edge having a similar radius of curvature of that of the upper portion of cutout edge 224 adjacent the lower end of the rear wall 214. As will be described in greater detail below, a connector is inserted through the keyway aperture 236 and in direct physical contact with the upper portion 238 of the keyway edge 234. Another connector is inserted through the cutout region 226 and is in direct physical contact with the upper downwardly concaved portion of cutout edge 224 formed near the lower end of the rear wall 214.

A major arm wall 240 extends forwardly from the rear wall 214 in a cantilevered manner and acts as the primary support for the clamps that are to be hung on the support arm 200 when connected with bracket 10. Major arm wall 240 has a number of different portions that will be discussed in turn. Major arm wall 240 includes an upper portion 242, a lower portion 244, and a central portion 246 that extends outwardly further towards the front end 202 a farther distance than the upper portion 242 or the lower portion 244. As the adjective descriptors imply, the upper portion 242 of major arm wall 240 is positioned above the central portion 246 and above the lower portion 244. The central portion 246 is located between the upper portion 242 and the lower 244 relative to the vertical direction. The lower portion 244 is below or beneath the upper portion 242 and the central portion 246 relative to the vertical direction. Each portion 242, 244, 246 is rigidly connected to the rear wall 214 and extend forwardly towards the front end 202 therefrom.

Upper portion 242 of major arm wall 240 includes an upper edge 248 and a front edge 250. Front edge 250 is generally orthogonal to the top edge 248. Top edge 248 extends forwardly from its connection with the first side edge 220 of the rear wall 214. Front edge 250 of upper portion 242 of major arm wall 242 extends vertically downward to a rigid connection which may form a rounded corner with top edge 248 to a lower end 252 of the front edge 250. A length 254 of the upper portion 242 of the major arm wall 240 is measured from the rear surface 230 of rear wall 214 to the front edge 250 of the upper portion 242. In one particular embodiment, dimension 254 may be in a range from about one-fourth inch to about one-half inch. However, other particular embodiments provide dimension 254 to be about one-half inch.

Lower portion 244 of major arm wall 240 includes a lower edge 256 that extends from the rear surface 230 of the rear wall 214 adjacent the first side edge 220 towards the front 202. Lower portion 244 further includes a front edge 258 extending vertically upward from a rounded edge 256 approximately perpendicular to the bottom edge 256. Front edge 258 extends upwardly to a downwardly concave edge 260 defining a short vertical slot 262 between the lower portion 244 and the central portion 246 of the major arm wall 240. The length of the lower portion 244 is shown as dimension 264 and is measured between the rear surface 230 of the rear wall 214 and the front edge 258 of the lower portion 244. Dimension 264 may be in a range from about one-half inch to about two inches. In one particular embodiment, dimension 264 is about one inch. Notably, some particular embodiments of the present disclosure provide that dimension 254 associated with the upper portion 242 is approximately half that of dimension 264 associated with the lower portion 244. Stated otherwise, the length of the lower portion 244 may be approximately twice that of the length 254 of the upper portion 242.

Central portion 246 of the major arm wall 240 includes a lower edge 266, a front edge 268, and a top edge 270. Lower edge 266 extends forwardly from its connection to the downwardly concave edge 260 on the lower portion 244. A forward end 272 of the lower edge 266 perpendicularly insects a vertical frontal plane 274. Front end 272 of lower edge 276 is connected with a lower end 276 of the front edge 268. Front edge 268 extends upwardly and outwardly (i.e., forwardly) from its lower end 276 such that an angle 278 is established between the front edge 268 and the frontal vertical plane 274. In one particular embodiment, angle 278 is in a range from about 5° to about 35°. In another particular embodiment, the range of angle 278 may be from about 10° to about 20°. In another particular embodiment, angle 278 may be about 15°. Front edge 268 extends relative to frontal vertical plane 274 between its lower end 268 and an upper end 280 that defines a rounded corner with the upper edge or top edge 270 of central portion 246 of major arm wall 240. Top edge 270 extends rearwardly from the rounded corner at the upper end 280 of front edge 268 to a rear end 284. The forward end 282 of the top edge 270 is positioned vertically above the rear end 284 of top edge 270. Stated otherwise, a horizontal plane 286 may intersect the rear end 284 of top edge 270. The horizontal plane 286 may be offset parallel and above the lower edge 266 of the central portion 246. The top edge 270 may be angled or tapered relative to the horizontal plane 286 at an angle 288 in a range from about 1° to about 10°. In one particular embodiment, angle 288 is about 5° such that the forward end 282 of the top edge 270 is approximately 5° above the rear end 284 of the top edge 270 relative to the horizontal plane 286. By positioning the forward end 282 of the top edge 270 vertically above the rear end 284, the central portion 246 of the major arm wall 240 may encourage or gravitationally bias clamps or other woodworking tools hanging or supported on the support arm 200 to be biased in the rearward direction towards the rear wall 214. The rearward bias of the tools may inhibit or discourage accidental sliding removing of the tools relative to the support arm 200 in the forward direction. Stated otherwise, as will be described in greater detail below, when the support arm 200 is mounted to the bracket 10, the rear wall 214 will be abutted with the front surface 108 of the central wall 98 and encourage clamps 506 supported by the major arm wall 240 to be gravitationally and slidably biased towards the bracket 10 away from the front 202 of the support arm 200. Collectively, edges 248, 250, 256, 258, 266, 268, 270 define a first major surface 290 opposite a second major surface 292 of the major arm wall 240.

Support arm 200 further includes a lower wall 294 extending outwardly from the major arm wall 240 adjacent its lower edge 266. Lower wall 294 includes a terminal end 296 that is approximately vertically coplanar with second side edge 222 of rear wall 214. Lower wall 294 includes an upwardly facing first or top surface 298 and a downwardly facing second or bottom surface 300. Top surface 298 of lower wall 294 is positioned substantially parallel with horizontal plane 284 and substantially orthogonal to frontal vertical plane 274. Top surface 298 of lower wall 294 may be positioned vertically lower than the downwardly concave edge 260 on lower portion 240 defining slot 262. Stated otherwise, the lower wall 294 includes a rear end 302 that cooperates with front edge 258 on lower portion 244 to define a portion of the slot 262 such that the slot 262 extends vertically upward above and beyond the upper surface 298 of lower wall 294. Inasmuch as the terminal end 296 of the lower wall 294 terminates approximately coplanar with the first side edge 222 of the rear wall 214, the width of the lower wall 294 approximates that of dimension 232 associated with the rear wall 214. In some implementations, lower wall 294 may act as a shelf or ledge which may support products, dunnage, or tools thereon. However, in other scenarios, lower wall 294 may act as a strengthening rib to provide sufficient rigidity to the major arm wall 240 when woodworking tools or other items or dunnage are hung on the central portion 246 thereof.

A vertical distance 304 is measured between the top surface 298 of lower wall 294 and the horizontal plane 284. Recall, horizontal plane 284 extends through the corner at which the rear end 284 of the top edge 270 meets the lower end 252 of the front edge 250. Accordingly, the vertical height 304 between the upper surface 298 and the horizontal plane 284 may vary in accordance with a design or intended support strength of the central portion 246 of the major arm wall 240. Stated otherwise, there may times where it may be advantageous for the central portion 246 of the major arm wall 240 to have an increased dimension 304 which would enable the central portion 246 to be stronger and support heavier duty or heavier weight clamps 506 than if the vertical dimension 304 of the central portion 246 between the upper surface 298 and the horizontal plane 286 were to be shortened. As will be described in greater detail below, the support arms 200 may take a number of different shapes as described herein. However, the primary distinction between the number of shapes that support arm 200 may take primarily varies the vertical distance 304 of the central portion 246 of the major arm wall 240. In one particular embodiment, support arm 200 may have a vertical distance 304 in a range from about two inches to about four inches. In a further particular embodiment, the vertical dimension 304 is about three inches. As will be described in greater detail below, it is preferable to have a pair of support arms 200 having a first vertical support distance 304 positioned closely adjacent a second pair of support arms 200 having a vertical support distance 304 that is different than the first pair of support arms 200. For example, a first pair of support arms 200 may have a vertical distance 304 of the central portion 246 in a range of about three inches. A second pair of support arms 200 would be mounted to the bracket 10 closely adjacent the first pair of support arms 200 that would have a greater vertical distance 304 in a range of about four inches to about six inches, and in one particular embodiment, a range of about five inches. Further, as will be described in greater detail below, the pair of support arms 200 with one vertical dimension 304 may be staggered with the second pair of support arms having a different vertical dimension. Then, thereafter, another pair of vertical support arms 200 having the first vertical dimension 304 may be positioned on the other side of the second pair of vertical support arms 200 having the different vertical dimension. While these references are made generally herein, specific embodiments will be described in greater detail below.

With continued reference to FIG. 4-FIG. 6, while it shown that the major arm wall 240 extends forwardly from a rigid connection with the first side edge 220 of the rear wall 214, it is to be understood that structure could be reversed such that the major arm wall 240 extends substantially forwardly in a cantilevered manner from a rigid connection with the second side edge 222 of the rear wall 214. Alternatively, it may be possible for the major arm wall 240 to extend forwardly in a cantilevered manner from a rigid connection with the rear wall 214 substantially between the first side edge 220 and the second side edge 222. However, this may require a slight redesign to insure a connection for the connectors to extend through aperture 236 and the cutout region 226.

FIG. 7, for example, depicts a second support arm 200A having a major arm wall 240A that extends forwardly from the second side edge 222 of rear wall 214. In this configuration, a lower wall 294A extends towards the first side (i.e., to the left in FIG. 7) to terminate at an end 296A that is vertically coplanar with first side edge 220 of rear wall 214. The remaining portions of the second support arm 200A are similar to support arm 200 and are identified with similar reference elements for like components.

As will be shown below, support arm 200 and support arm 200A define a first pair of support arms that will be attached to the bracket 10 to hang clamps 506 thereon. When the support arm 200 and support arm 200A are mounted on the bracket 10 to define the first pair of support arms, they are oriented such that the lower arms 296, 296A extend outwardly away from each other. State otherwise, when mounted as a pair, the major arms 240, 240A are spaced apart parallel and oriented in a manner such that surface 290 on the major arm 240 of first support arm 200 faces the surface 292 on the major arm 240A of the second support arm 200A.

Figure 9:
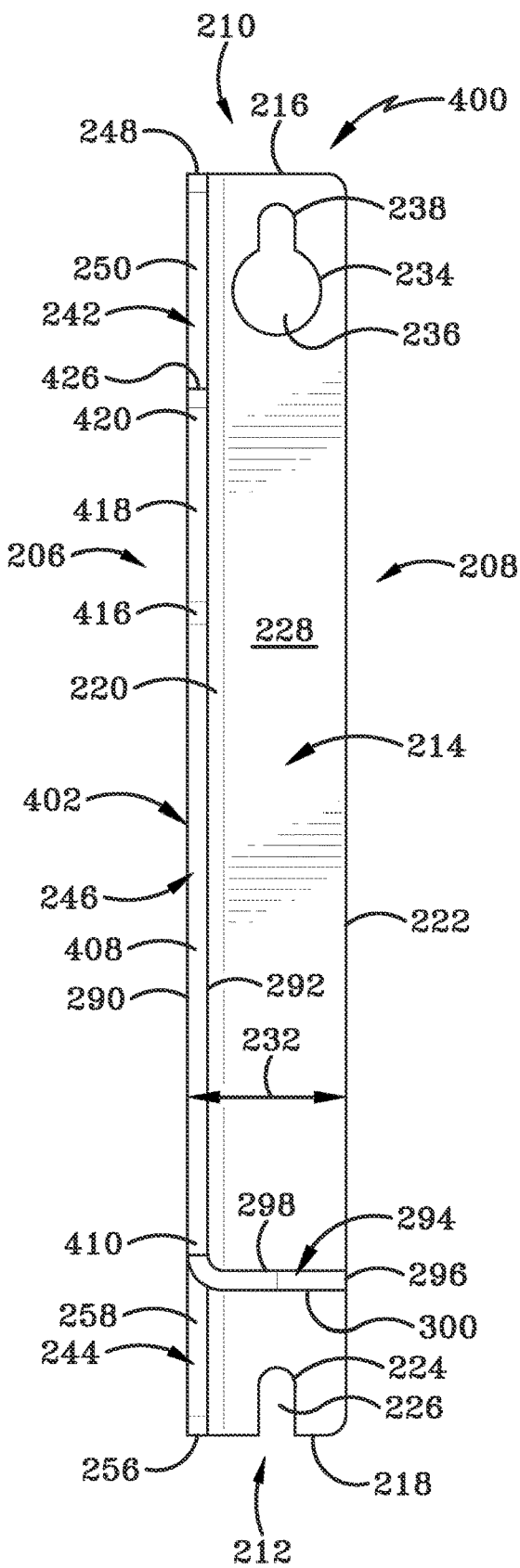
FIG. 9 is an end elevation view of the second support arm.

FIG. 8-FIG. 10 depict another support arm 400 in accordance with the present disclosure. Support arm 400 has many components that are similar to support arm 200 or 200A and as such, similar components identified with the same reference elements are not repeated for brevity. Support arm 400 includes a major arm 402 having vertical height 404 that is greater than vertical height 304 of support arm 200. The vertical height 404 of major arm 402 is measured from the lower edge 266 of major arm 402 to horizontal plane 406. The height 404 of support arm 400 is in a range of about four inches to about six inches, and in one particular embodiment, a range of about five inches. Thus, an exemplary ratio of the height 404 of support arm 400 to height 304 on support arm 200 is about 5:3.

Support arm 400 may include a frontal edge 408 that extends upwardly from a rigid connection with the forward end 272 of lower edge 266. Front edge 408 extends upwardly and outwardly (i.e., forwardly) from its lower end 410 such that an angle 412 is established between the front edge 408 and the frontal vertical plane 414. In one particular embodiment, angle 412 is in a range from about 5° to about 35°. In another particular embodiment, the range of angle 412 may be from about 10° to about 20°. In another particular embodiment, angle 412 may be about 15°. Front edge 408 extends relative to frontal vertical plane 414 between its lower end 410 and a point 416 that defines a rounded corner where the frontal edge 408 extends directly vertical along an upper edge 418 that is parallel with frontal plane 414. The upper edge 418 extends to an upper end 420 that joins the top edge 422 of central portion of major arm wall 402. Top edge 422 extends rearwardly from the rounded corner at the upper end 420 of edge 418 to a rear end 424. The forward end 426 of the top edge 422 is positioned vertically above the rear end 424 of top edge 422. Stated otherwise, a horizontal plane 406 may intersect the rear end 424 of top edge 422. The horizontal plane 406 may be offset parallel and above the lower edge 266 of the central portion of major arm 402. The top edge 422 may be angled or tapered relative to the horizontal plane 406 at an angle 428 in a range from about 1° to about 10°. In one particular embodiment, angle 428 is about 5° such that the forward end 426 of the top edge 422 is approximately 5° above the rear end 424 of the top edge 422 relative to the horizontal plane 406.

Support arm 400 may have a longer cantilevered length than support arm 200. In one particular embodiment, the cantilevered length of the support arm 400 may be about four to eight inches longer than that of support arm 200 when both support arms 200, 400 are mounted to bracket 10.

Figure 11:
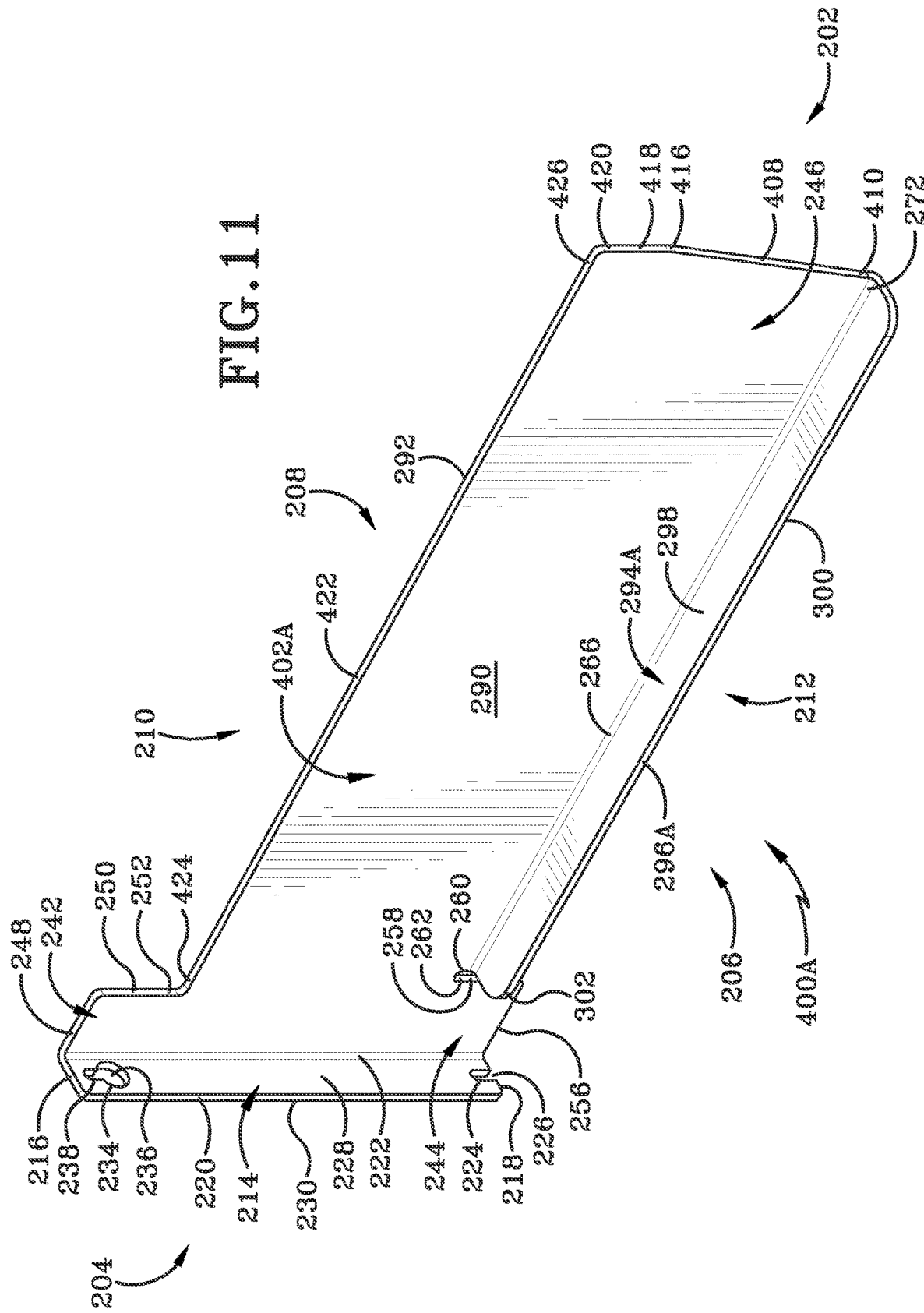
FIG. 11 is a perspective view of a variant of the second support arm having some components oriented in an opposite direction than the second support arm shown in FIG. 8-FIG. 10.

FIG. 11 depicts another support arm 400A similar to support arm 400 but rather has a major arm wall 402A that extends forwardly from the second side edge 222 of rear wall 214. In this configuration, a lower wall extends 294A towards the first side (i.e., to the left in FIG. 11) to terminate at an end 296A that is vertically coplanar with first side edge 220 of rear wall 214.

As will be shown below, support arm 400 and support arm 400A define a second pair of support arms that will be attached to the bracket 10 to hang clamps 506 thereon. In one embodiment, the second pair of support arms are connected to bracket 10 adjacent the first pair of support arms defined by arms 200, 200A. When the support arm 400 and support arm 400A are mounted on the bracket 10 to define the second pair of support arms, they are oriented such that the lower arms 296, 296A extend outwardly away from each other. State otherwise, when mounted as a pair, the major arms 402, 402A are spaced apart parallel and oriented in a manner such that a first major surface on the major arm 402 of first support arm 400 faces the second major surface on the major arm 402A of the second support arm 400A.

Figure 12:
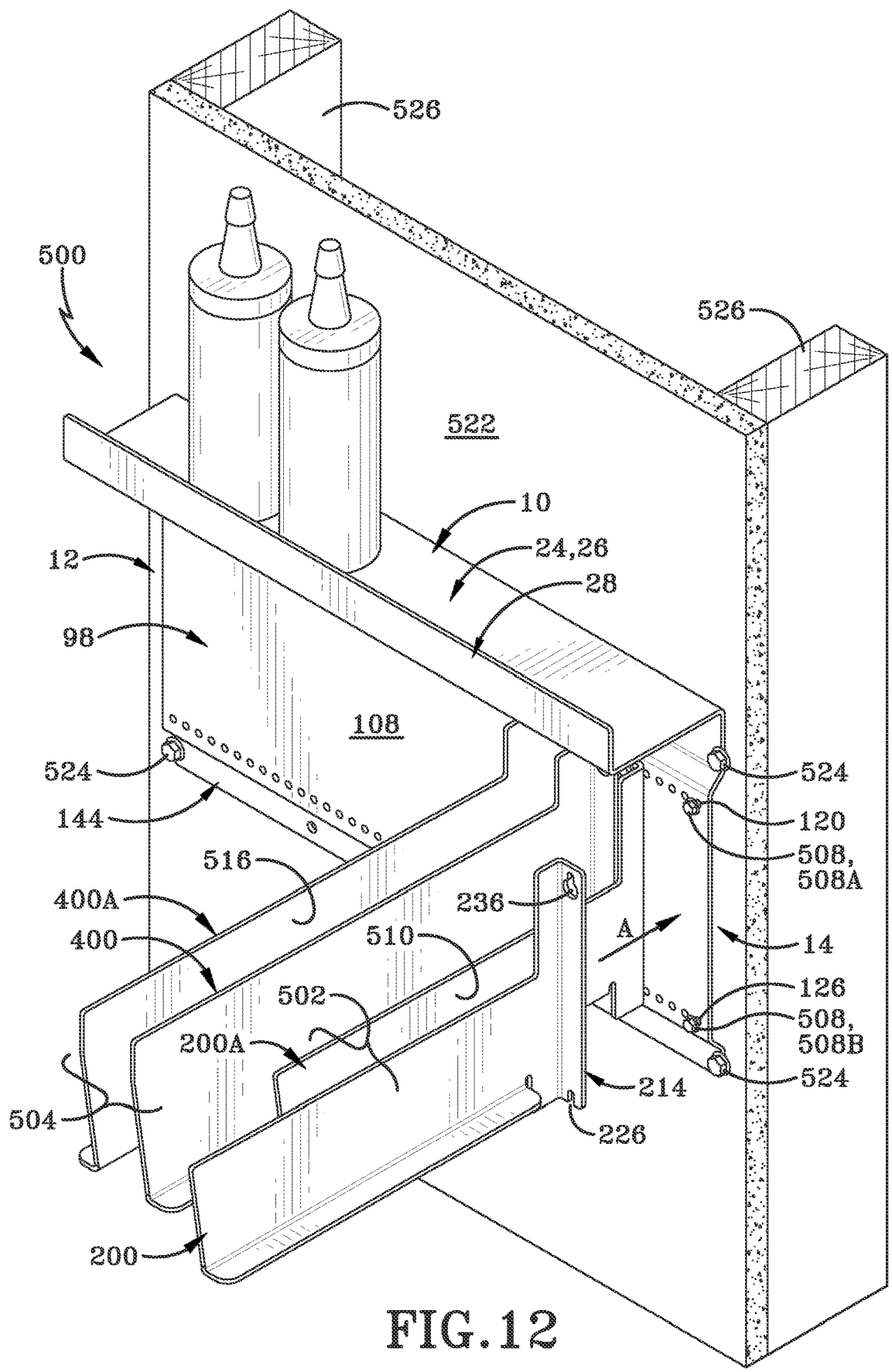
FIG. 12 is a perspective view of the tool storage system partially assembled and operationally depicting the first support arm being installed on the bracket.

FIG. 12 depicts a wood working clamp rack or tool storage system generally at 500. The clamp racking system 500 includes the bracket 10, the first support arm 200 and the second support arm 200A that collectively define a first pair of support arms 502, and the two support arms 400, 400A that collectively define a second pair of support arms 504. The first pair of support arms 502 and the second pair of support arms 504 are connected with bracket 10 and extend outwardly from the central portion 98 in a cantilevered manner in order to support word working clamps 506 (FIG. 13) thereon.

When the first pair of support arms 502 are connected to the bracket 10, the first pair of support arms 502 are offset to one side of the second pair of support arms 504. In the shown embodiment, when viewed from the front, the first pair of support arms 502 are offset towards the second side (to the right in FIG. 12) from the second pair of support arms 504. FIG. 12 depicts that support arm 200 from the first pair of support arms 502 has yet to be installed on bracket 10. However, as indicated by Arrow A, support arm 200 is moved in a direction towards the front surface 108 of the central portion 98 on bracket 10. The rear wall 214 of support arm 200 is aligned vertically such that the rear surface 213 of rear wall 214 directly abuts the front surface 108 of the central portion 98. A connector 508 is used to attach the support arm 200 to the bracket 10. More particularly, a first connector 508A extends through the keyway aperture 236 in the rear wall 214. A second connector 508B extends through the lower slot 226 in the rear wall 214. With the connectors 508A, 508B extending through the rear wall 214 of support arm 200, the support arm may be moved vertically downward slightly such that the connector 508A is inserted into the upper portion 238 of the keyway aperture 236 and that the lower connector 508B contacts the downwardly facing concave edge 224. The connectors may then be threadably tightened or secured to the bracket 10. More particularly, first connector 508A is inserted through one of the apertures 120 and the second connector 508B is inserted through one of the apertures 126. The respective apertures 120,126 receiving the connectors 508A, 508B are in direct vertical alignment. After the first pair of support arms 502 have both been mounted to the bracket 10, they define a gap 510 therebetween. More particularly, the gap 510 is defined between the first side surface of the major arm 240 on the first support arm 200 and the second side surface on the major support arm 240A on the second support arm 200A. The width of the gap is aligned in the same direction as the longitudinal length of the bracket 10. In one particular embodiment, the width of the gap is sized complementary to a clamp bar 512 on a first wood working clam 506A. More particularly, the gap 510 may be slightly larger than the width of the clamp bar 512 on the first wood working clamp 506A so as to allow the clamp bar 512 to be slidably received through the gap 510 and supported by the first pair of support arms 502. In one particular embodiment, the width dimension 514 of the gap 510 may be in range from about 1 inch to about 3 inches. In another particular embodiment, the width dimension 514 of the gap 510 may be in a range from about ½ inch to about 4 inches. In another particular embodiment, the width dimension 514 of the gap 510 may be in a range from about ½ inch to about 4 inches. In one particular embodiment, the width dimension 514 of the gap 510 is about 1 inch.

The width dimension 514 between the first pair of support arms 502 may vary depending on which aperture 120, 126 the connectors 508A, 508B connect the support arm 200 to the bracket 10. As one having ordinary skill in the art would understand, the width dimension is variable depending on where along the longitudinal length L of bracket 10, the support arm 200 is installed relative to the other support arm 200A forming the first pair of support arms 502. Should the wood working clamps 506 have a clamp bar 502 with a greater dimension, then the gap 510 would need to be increased to have a greater width dimension 514. This may be accomplished by spacing the respective support arms 200, 200A farther away from each other along the longitudinal length L of bracket 10.

A similar mounting arrangement is provided for the second pair of support arms 504 defined by the first support arm 400 and the second support arm 400A. Similarly, a gap 516 is defined by the respective major arms of the brackets 400, 400A. The gap 516 has a width dimension 518 that may be larger than the width dimension 514 of the gap 510 defined by the first pair of support arms 502. Gap 516 is configured to receive a clamp bar 520 on a second wood working clamp 506B therebetween.

FIG. 12 depicts that the bracket 10 is mounted to a wall surface 522 by inserting connectors 524 through the wall 522 and in to respective studs 526 that are typically spaced apart sixteen inches on center. One exemplary connector 524 may be inserted through the arcuate cutout 76 defined in the upper wall 56 and the arcuate cutout 168 defined in the lower wall 144 of bracket 10. However, other connectors 524 may be inserted through apertures 80 formed in the upper wall 56 if the aperture 80 is aligned with the corresponding stud 526 behind the wall 522.

With continued reference to FIG. 12, the tool storage system 500 including the bracket 10 that is adapted to be mounted to a support surface or wall 522 has a first support arm 200 coupled to the bracket and defines a first support arm space in the area adjacent the first support arm. The first support arm space may encompass the region or space of free air or volume adjacent the first support arm 200. The first support arm space may be a region, in one embodiment, that is offset to the first side or to the second side of the major surface of the support arm and is partially bounded by the frontal surface of bracket 10 and the respective side of the cantilevered arm. The second support arm 400 is also coupled to the bracket 10 and defines a second support arm space that may encompass the region, space of free air, or volume adjacent the second support arm 400. The second support arm spaced may also be partially bounded by the frontal surface of bracket 10, wherein the first support arms is at least partially disposed within the second support arm space. In some instances, such as that which is shown in FIG. 12, the first support arm 200 can at least partially nests adjacent the second support arm 400. The major portion of the first support arm 200 has a first side surface and a second side surface, and the major portion of the second support arm 400 has a first side surface and a second side surface, wherein the second side surface of the second support arm defines a portion of the second support arm space.

FIG. 13 depicts a frontal view of the system 500 in which wood working claims 506 are supported by one or both of the pairs of support arms 502, 504. In some instances, the wood working clamps 506 may be generally referred to as a tool. The manner in which the wood working clamps or tools are hung or otherwise supported by the respective pairs of support arms 502, 504 may sometimes define a space based on the shape of the tool. For example, when the tool is one of the wood working clamps 506, such as the second wood working clamp 506B, the wood working clamp 506B includes the clamp bar 520 and two orthogonally oriented crossbars, namely, a first crossbar 528 and a second crossbar 530. Ordinarily, the first crossbar 528 is fixed relative to the end of the clamp bar 520 and the second crossbar 530 is slidably connected to the clamp bar 520 configured to move along its longitudinal length in order to provide a clamping force when adjusted by a handle 532 to an item that is to be clamped by the tool. Typically, the first and second crossbars 528, 530 extend outwardly from the clamp bar 520 in the same direction. As shown in FIG. 13, when viewed from the front, the tool, such as the wood working clamp 506B, is generally C-shaped or F-shaped in configuration. The C-shaped or F-shaped configuration of the tool defines a first space 534 between the first crossbar, the clamp bar 520, and the second crossbar 530. More particularly, the first space 534 is defined by an edge or surface 536 on the first crossbar, a longitudinal edge or surface 538, and an edge or surface 540 on the second crossbar 530. The first space 534 is configured to receive a portion of the other tools supported by the other pair of support arms therein. More particularly, and as shown in FIG. 13, the first wood working clamp 506A is disposed within the first space 534 so as to nest with the second clamp 506B. The nesting relationship between the first clamp 506A and the second clamp 506B may be a non-contact nesting relationship where the first clamp 506 first within the open region or space 534 defined by the second clamp 506B but does not directly contact the second clamp 506B. The first space 534 defined by the second tool 506B enables the system 500 to store more clamps or tools in a narrower area relative to the wall 522. Stated otherwise, more tools or clamps can be stored and carried by the bracket and respective support arms by staggering heights of the support arms to enable adjacent clamps to nest within the space defined by a larger clamp. Stated otherwise, the first pair of support arms have a lower vertical height 304 and are configured to store a smaller or shorter tool thereon. The first pair of support arms 502 being disposed adjacent the second pair of support arms 504 that have a greater vertical height 404 are configured to store a larger tool thereon. Smaller tool 506A nests within the space 534 defined by the larger second tool 506B.

As depicted in FIG. 13, the crossbars on each respective clamp 506A, 506B may extend in the same direction when clamp 506A is nested within space 534 of clamp 506B. However, there may be other clamps that are part of system 500 that have cross bars that extend in an opposite direction. For example, in FIG. 13, clamps 506A, 506B have cross bars that extend towards the second end of the bracket 10 (i.e., to the right when viewed from the front), however there may be other clamps that are offset towards the first side (i.e., to the left when viewed from the front) that have cross bars that extend outwardly towards the first side. Thus, the similar direction relationship of the cross bars applies to the two sets of clamps that are nested relative to each other and not necessarily to other clamps within the system 500.

More than one tool may be supported by each pair of support arms. For example, the width of the transversely aligned dimension of the wood working clamp 506 may be significantly less than the transversely aligned length of each one of the support arms 200, 200A or 400, 400A. As such, a plurality of wood working clamps 506 may be hung on one pair of support arms 502 or 504. Thus, the cantilevered length of each respective support arm enables a plurality of wood working clamps hung thereon. Furthermore, the tapered or sloped nature of the upper wall of each respective support arm in the first pair of support arms 502 or the second pair of support arms 504 is configured to gravitational bias the plurality of support arms towards the bracket 10 to reduce the likelihood that the plurality of wood working clamps 506 supported by the pair of support arms does not inadvertently fall off or otherwise be removed from its support.

It would be possible to modify system 500 to provide support arms that do not require a pair of adjacent support arms to support the woodworking clamps 506 or other tools. For example, in order to hang a different type of hand tool, only a single support arm would be necessary. Thus, there may be a first support arm of a first size supporting a first tool and a second support arm of a second size supporting a second tool, wherein the first and second tools nest relative to each other in order to reduce the overall length or area of the system relative to the wall mounting surface.

FIG. 13 further depicts the first bar 512 on the first woodworking clamp and the second bar on the second woodworking clamp 506B defining a portion of the first space 534. The first bar 512 is placed within the first space 534 in order to reduce a dimension of the clamp rack system 500 by storing the first woodworking clamp 506A in the first space 534 defined by the second tool 506B. There may be a first edge on the first bar 512 of the first woodworking clamp 506A and a second edge on the second bar 520 of the second woodworking clamp 506B. The first edge may be spaced parallel to the second edge within the first space 534. Further, there may be a first upper edge 270 on the first support arm 200 and a second upper edge 422 on the second support arm 400. A first crossbar on the first woodworking clamp 506A supported by the first upper edge 270. A second crossbar 528 on the second woodworking tool 506B is supported by the second upper edge 422. In this instance, the second crossbar 528 is vertically above the first crossbar on clamp 506A in the first space 534.

Figure 14:
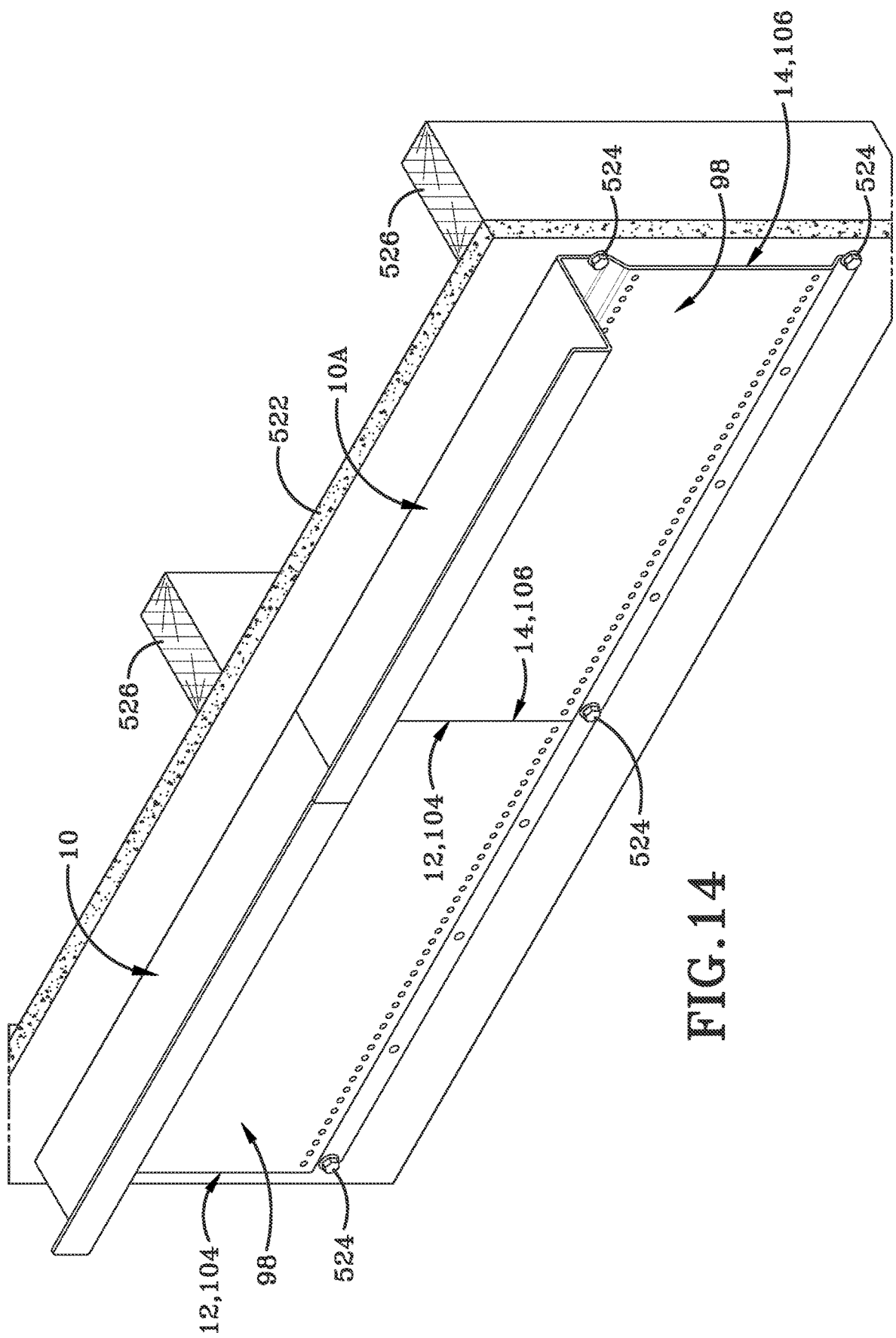
FIG. 14 is a perspective view of two brackets installed end-to-end depicting that the system can be increased in length as necessary to add a plurality of arms for supporting a plurality of tools.

FIG. 14 depicts a part of a clamp rack system in which two brackets are used. Namely, a first bracket 10 and second bracket 10A. The second bracket 10A is abutted at its first end 12 with the second end 14 of the first bracket 10. As described above, when the first bracket 10 is abutted with the second bracket 10A, the second bracket 10A has arcuate cutout sections 164 and 72 that align with respective arcuate cutout sections 76 and 168 in the second side 14 of the first bracket 10. Collectively, the arcuate sections form generally circular apertures that receive a connector 524 that is threadably inserted through wall 522 into the stud 526. Thus, the overall length of the system 500 may be increased by adding more brackets that are identically shaped in cross section to each other end-to-end along the wall 522 surface. While not depicted in FIG. 14, the support arms 200, 200A and 400, 400A can be connected to either one of the brackets 10, 10A to construct the system for supporting tools or other woodworking clamps 506 thereon. The entire system has an overall length for storing and supporting the same number of tools or clamps 506 that is less than the length that would be required if the clamps 506 were stored side-to-side and not nested within each other based on the differing heights of adjacent pairs of support arms 502, 504.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, any method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. A method for storing tools comprising:
connecting a first support arm to a first bracket mounted to a support surface;
connecting a second support arm to the first bracket adjacent the first support arm;
hanging a first tool on the first support arm;
hanging a first crossbar of a pair of crossbars of a second tool on the second support arm; and
nesting a portion of the first tool within a space collectively defined by the pair of crossbars of the second tool and a clamp bar of the second tool.

2. The method of claim 1, further comprising:
orienting a clamp bar on the first tool parallel to the clamp bar on the second tool within the space defined by the second tool.

3. The method of claim 1, further comprising:
connecting the first support arm and the second support arm to a first row of horizontal apertures formed in the first bracket.

4. The method of claim 3, further comprising:
disposing an upper edge on a major portion of the first support arm and a lower vertical height than an upper edge on a major portion of the second support arm.

5. The method of claim 1, further comprising:
defining a first pair of support arms by connecting a third support arm to the first support arm but having a lower arm that extends in an opposite direction than that of the first support arm;
defining a second pair of support arms by connecting a fourth support arm to the second support arm but having a lower arm that extends in an opposite direction than that of the second support arm; and
disposing the second pair of support arms offset to one side of the first pair of support arms.

6. The method of claim 5, further comprising:
hanging the first tool on the first pair of support arms; and
hanging the second tool on the second pair of support arms, wherein the first tool nests with the second tool while hung on the first pair of support arms.

7. The method of claim 1, further comprising:
providing a second bracket having an arcuate cutout formed in an edge of the second bracket;
aligning a first end of the second bracket with a second end of the first bracket; and
defining an aperture with the arcuate cutout in the second bracket and a corresponding arcuate cutout in an edge of the first bracket.

8. The method of claim 1, further comprising:
orienting a clamp bar on the second tool closer to a first end of the first bracket than a terminal end of a cross bar on the second tool that is oriented closer to a second end of the first bracket.

9. The method of claim 1, further comprising:
abutting a first rear wall of the first support arm with a front surface of the first bracket, wherein the first rear wall is the rearmost part of the first support arm; and
abutting a second rear wall of the second support arm with the front surface of the first bracket, wherein the second rear wall is the rearmost part of the second support arm.

10. The method of claim 3, further comprising:
operably engaging a first connector with a first horizontal aperture of the first row of horizontal apertures;
inserting the first connector through a first keyway aperture defined by the first support arm; and
threadably tightening the first connector to the first support arm and the first bracket.

11. The method of claim 10, further comprising:
operably engaging a second connector with a second horizontal aperture of the first row of horizontal apertures;
inserting the second connector through a second keyway aperture defined by the second support arm; and
threadably tightening the second connector to the second support arm and the first bracket, wherein the second support arm is operably engaged to the first bracket adjacent to the first support arm relative to said first bracket.

12. The method of claim 11, further comprising:
connecting the first support arm and the second support arm to a second row of horizontal apertures formed in the first bracket opposite to the first row of horizontal apertures.

13. The method of claim 12, further comprising:
operably engaging a third connector with a first horizontal aperture of the second row of horizontal apertures;
inserting the third connector through a first lower slot defined by the first support arm opposite to the first keyway aperture; and
threadably tightening the third connector to the first support arm and the bracket.

14. The method of claim 13, further comprising:
operably engaging a fourth connector with a second horizontal aperture of the second row of horizontal apertures;
inserting the fourth connector through a second lower slot defined by the second support arm opposite to the second keyway aperture; and
threadably tightening the fourth connector to the second support arm and the bracket.

15. The method of claim 1, further comprising:
hanging products, dunnage, or tools from a lower wall of one of the first support arm and the second support arm, wherein the lower wall is continuous and uninterrupted.

16. The method of claim 7, further comprising:
operably engaging a first end of the first bracket to the support surface with a first connector via an arcuate cutout formed in an edge at the first end of the first bracket;
operably engaging a second end of the second bracket to the support surface with a second connector via an arcuate cutout formed in an edge at the second end of the second bracket; and
operably engaging the second end of the first bracket and the first end of the second bracket to the support surface with a third connector via the aperture defined with the arcuate cutout in the second bracket and the corresponding arcuate cutout in the edge of the first bracket.

17. The method of claim 1, further comprising:
operably engaging a first pair of support arms to the bracket;
defining a first gap between a first side surface of a first support arm of the first pair of support arms and a second side surface of a second support arm of the first pair of support arms;
operably engaging a second pair of support arms to the bracket; and
defining a second gap between a first side surface of a first support arm of a second pair of support arms and a second side surface of a second support arm of the second pair of support arms, wherein the second gap is greater than the first gap.

18. The method of claim 17, further comprising:
inserting a clamp bar of a first tool into the first gap;
operably engaging the first clamp bar with the first pair of support arms; and
inserting the clamp bar of a second tool into the second gap, wherein a width of the clamp bar of the second tool is greater than a width of the clamp bar of the first tool.

19. A method for storing tools comprising:
operably engaging a first connector with a first horizontal aperture of a first row of horizontal apertures formed in a first bracket;
inserting the first connector through a first keyway aperture defined by a first support arm;
threadably tightening the first connector to the first support arm and the first bracket such that the first support arm is connected with the first bracket;
connecting a second support arm to the first bracket adjacent the first support arm;
hanging a first tool on the first support arm;
hanging a second tool on the second support arm; and
nesting the first tool within a space defined by the second tool on the second support arm; wherein the first tool is located in a first vertical plane and the second tool is located in a second vertical plane at a point which the first vertical plane intersects the second vertical plane.

* * * * *